United States Patent
Shibata et al.

(10) Patent No.: US 8,200,059 B2
(45) Date of Patent: Jun. 12, 2012

(54) ADHESIVE COMPOSITION FOR OPTICAL WAVEGUIDE, ADHESIVE FILM FOR OPTICAL WAVEGUIDE AND ADHESIVE SHEET FOR OPTICAL WAVEGUIDE EACH USING THE SAME, AND OPTICAL DEVICE USING ANY OF THEM

(75) Inventors: Tomoaki Shibata, Ibaraki (JP); Atsushi Takahashi, Ibaraki (JP); Keisuke Ookubo, Ibaraki (JP); Tetsurou Iwakura, Ibaraki (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 360 days.

(21) Appl. No.: 12/522,433

(22) PCT Filed: Mar. 13, 2008

(86) PCT No.: PCT/JP2008/054650
§ 371 (c)(1), (2), (4) Date: Jul. 8, 2009

(87) PCT Pub. No.: WO2008/114696
PCT Pub. Date: Sep. 25, 2008

(65) Prior Publication Data
US 2010/0129045 A1   May 27, 2010

(30) Foreign Application Priority Data

Mar. 16, 2007 (JP) ................. 2007-068420
Mar. 16, 2007 (JP) ................. 2007-068421
Dec. 14, 2007 (JP) ................. 2007-323779
Dec. 14, 2007 (JP) ................. 2007-323784

(51) Int. Cl.
*G02B 6/00* (2006.01)

(52) U.S. Cl. .................................... 385/141
(58) Field of Classification Search ............. 385/141
See application file for complete search history.

(56) References Cited

U.S. PATENT DOCUMENTS

| 2002/0185222 A1 | 12/2002 | Wigdorski et al. |
| 2003/0069331 A1* | 4/2003 | Teiichi et al. .............. 523/176 |
| 2006/0100315 A1 | 5/2006 | Inada et al. |
| 2010/0266258 A1* | 10/2010 | Shibata et al. ............... 385/141 |

FOREIGN PATENT DOCUMENTS

| JP | 2618682 | 3/1997 |
| JP | 2004-069824 | 3/2004 |
| WO | WO 2005/112091 A1 | 11/2005 |

OTHER PUBLICATIONS

Singapore Official Action dated Jan. 29, 2010, for Application No. 200904175-7.

* cited by examiner

*Primary Examiner* — Sung Pak
(74) *Attorney, Agent, or Firm* — Antonelli, Terry, Stout & Kraus, LLP.

(57) ABSTRACT

The present invention provides an adhesive composition for an optical waveguide which comprises (a) an epoxy resin, (b) a curing agent and (c) a high molecular compound, in which a total light transmittance and a light transmittance in a wavelength of 700 to 1600 nm in a cured matter of the adhesive composition are 80% or more and in which a transparency is consistent with a heat resistance, an adhesive film for an optical waveguide prepared by forming the above adhesive composition into a film form, an adhesive sheet for an optical waveguide comprising the above adhesive composition and a supporting base material and an optical device produced by using them.

29 Claims, 4 Drawing Sheets

ADHESIVE COMPOSITION FOR OPTICAL WAVEGUIDE, ADHESIVE FILM FOR OPTICAL WAVEGUIDE AND ADHESIVE SHEET FOR OPTICAL WAVEGUIDE EACH USING THE SAME, AND OPTICAL DEVICE USING ANY OF THEM

BACKGROUND OF THE INVENTION

The present invention relates to an adhesive composition for an optical waveguide, an adhesive film for an optical waveguide and an adhesive sheet for an optical waveguide which are prepared by using the same and an optical device prepared by using the above matters.

RELATED ART

In high speed and high density signal transmission between electronic devices and between printed wiring boards, it is observed that transmission through conventional electric wirings is being restricted in a rise in a speed and a density due to barriers brought about by mutual interference and attenuation of signals. In order to break through such restrictions, investigated is a technology of connecting electronic devices and printed wiring boards with each other by means of light, so-called optical interconnection.

Adhesives for an optical waveguide which are used for the above optical interconnection have involved problems of controlling a film thickness of an adhesive layer, a handling property and a flexibility in addition to a transparency, a high heat resistance and a high reliability. For example, fluorine-containing epoxy resins are proposed (refer to, for example, a patent document 1). However, they are inferior in a heat resistance against solder, and the materials therefor are liquid, so that it is difficult to control a film thickness thereof and handle them. Further, elastic moduli thereof are high after cured, and flexibilities thereof are inferior as well, so that they are not satisfactory as adhesives for an optical waveguide.
Patent document 1: Japanese Patent No. 2618682

DISCLOSURE OF THE INVENTION

In light of the problems of the conventional techniques described above, an object of the present invention is to provide an adhesive composition for an optical waveguide in which a transparency is consistent with a heat resistance, an adhesive film for an optical waveguide and an adhesive sheet for an optical waveguide which are prepared by using the same and an optical device produced by using the above matters.

Intensive investigations repeated by the present inventors have resulted in finding that the problems described above can be solved by the following method. That is, the present invention provides:

(1) an adhesive composition for an optical waveguide comprising (a) an epoxy resin, (b) a curing agent and (c) a high molecular compound, wherein a total light transmittance and a light transmittance in a wavelength of 700 to 1600 nm in a cured matter of the adhesive composition are 80% or more,
(2) the adhesive composition for an optical waveguide according to the above item (1), wherein after carrying out three times a reflow test at a maximum temperature of 265° C., a total light transmittance and a light transmittance in a wavelength of 700 to 1600 nm in the above cured matter are 80% or more,
(3) the adhesive composition for an optical waveguide according to the above item (1) or (2), wherein a change in a refractive index of the above cured matter before and after carrying out three times the reflow test at a maximum temperature of 265° C. falls within ±0.005,
(4) the adhesive composition for an optical waveguide according to any of the above items (1) to (3), wherein an evaluation score in an adhesive property of the above cured matter which is measured by a cross-cut tape method after carrying out three times the reflow test at a maximum temperature of 265° C. is 8 points or more,
(5) the adhesive composition for an optical waveguide according to any of the above items (1) to (4), wherein in a dynamic bending endurance test of an optical waveguide provided with an adhesive prepared by using the adhesive composition described above, mechanical breakage is not generated on the optical waveguide after carrying out 100,000 times the bending test at a curvature radius of 5 mm,
(6) the adhesive composition for an optical waveguide according to any of the above items (1) to (5), wherein assuming that a total mass of (a) the epoxy resin and (b) the curing agent is set to A and that a mass of (c) the high molecular compound is set to B, a ratio A/B is 0.24 to 1.0,
(7) the adhesive composition for an optical waveguide according to any of the above items (1) to (6), wherein (a) the epoxy resin is a solid epoxy resin having a softening point of 50° C. or higher which is measured by a ring and ball method,
(8) the adhesive composition for an optical waveguide according to any of the above items (1) to (7), wherein (a) the epoxy resin does not have a mutagenicity,
(9) the adhesive composition for an optical waveguide according to any of the above items (1) to (8), wherein (b) the curing agent is a phenol resin having a hydroxyl equivalent of 150 g/eq or more,
(10) the adhesive composition for an optical waveguide according to the above item (9), wherein (b) the curing agent is a phenol resin represented by the following Formula (I):

[Formula 1]

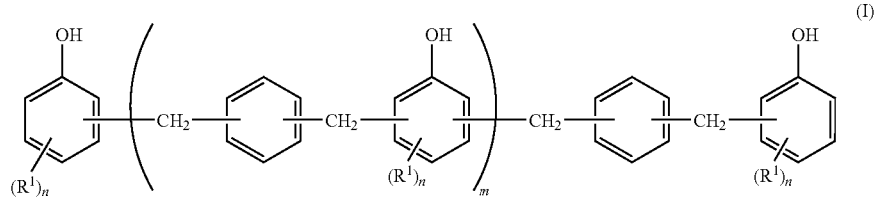

(wherein $R^1$ each may be the same or different and represents a hydrogen atom, a linear or branched alkyl group having 1 to 10 carbon atoms, a cyclic alkyl group, an aralkyl group, an alkenyl group, a hydroxyl group, an aryl group or a halogen atom; n represents an integer of 1 to 3; and m represents an integer of 0 to 50),

(11) the adhesive composition for an optical waveguide according to the above item (10), wherein the phenol resin represented by Formula (I) has a water absorption coefficient of 2 mass % or less,

(12) the adhesive composition for an optical waveguide according to any of the above items (1) to (11), wherein (c) the high molecular compound is a functional group-containing acryl copolymer,

(13) the adhesive composition for an optical waveguide according to the above item (12), wherein the functional group-containing acryl copolymer is an epoxy group-containing acryl copolymer,

(14) the adhesive composition for an optical waveguide according to the above item (13), wherein the epoxy group-containing acryl copolymer contains 0.5 to 6 mass % of glycidyl acrylate or glycidyl methacrylate as a raw material therefor,

(15) the adhesive composition for an optical waveguide according to any of the above items (12) to (14), wherein the functional group-containing acryl copolymer has a weight average molecular weight of 100,000 or more,

(16) the adhesive composition for an optical waveguide according to any of the above items (12) to (15), wherein the functional group-containing acryl copolymer has a glass transition temperature of −50 to 30° C.,

(17) the adhesive composition for an optical waveguide according to any of the above items (1) to (16), further comprising (d) a filler,

(18) the adhesive composition for an optical waveguide according to any of the above item (17), wherein (c) the high molecular compound is the epoxy group-containing acryl copolymer containing 1.5 to 2.5 mass % of glycidyl acrylate or glycidyl methacrylate and having a weight average molecular weight of 100,000 or more; 1 to 50 parts by mass of (d) the filler based on total 100 parts by mass of (a) the epoxy resin and (b) the curing agent is contained; and (d) the filler is an inorganic filler having an average particle diameter of 0.01 to 0.1 μm,

(19) the adhesive composition for an optical waveguide according to any of the above items (1) to (18), further comprising (e) a curing accelerating agent,

(20) the adhesive composition for an optical waveguide according to the above item (19), wherein the (e) curing accelerating agent is an imidazole compound,

(21) the adhesive resin composition for an optical waveguide according to any of the above items (1) to (5), wherein (b) the curing agent is a phenol base epoxy resin curing agent; (c) the high molecular compound is a high molecular compound containing a functional group and having a weight average molecular weight of 100,000 or more; and the adhesive composition further comprises (f) a photoreactive monomer in which a cured matter thereof obtained by irradiation with a UV ray has Tg of 250° C. or higher and (g) a photoinitiator generating a base and a radical by irradiation with a UV ray having a wavelength of 200 to 450 nm,

(22) the adhesive resin composition for an optical waveguide according to the above item (21), wherein (c) the high molecular compound containing a functional group and having a weight average molecular weight of 100,000 or more is a glycidyl group-containing (meth)acryl copolymer containing 0.5 to 6% by mass of a glycidyl group-containing repetitive unit,

(23) the adhesive resin composition for an optical waveguide according to the above item (21) or (22), comprising 5 to 250 parts by mass of (a) the epoxy resin, 5 to 100 parts by mass of (f) the photoreactive monomer in which a cured matter thereof obtained by irradiation with a UV ray has Tg of 250° C. or higher and 0.1 to 20 parts by mass of (g) the photoinitiator generating a base and a radical by irradiation with a UV ray of 200 to 450 nm each per 100 parts by mass of (c) the high molecular compound containing a functional group and having a weight average molecular weight of 100,000 or more and comprising (b) the phenol base epoxy resin curing agent in a range in which an equivalent ratio of a phenolic hydroxyl group to one epoxy group of the above epoxy resin is 0.5 to 1.5,

(24) an adhesive film for an optical waveguide prepared by forming the adhesive composition according to the above items (1) to (20) into a film form,

(25) an adhesive sheet for an optical waveguide comprising the adhesive resin composition for an optical waveguide according to any of the above items (21) to (23) and a supporting base material and

(26) an optical device prepared by adhering an optical waveguide with the adhesive composition for an optical waveguide according to the above item (1) or (23), the adhesive film for an optical waveguide according to the above item (24) or the adhesive sheet according to the above item (25).

According to the present invention, capable of being provided are an adhesive composition for an optical waveguide which is excellent in a transparency and a heat resistance, an adhesive film for an optical waveguide and an adhesive sheet for an optical waveguide which are prepared by using the same and optical devices by using the above matters.

BRIEF EXPLANATIONS OF THE DRAWINGS

Figure 6:
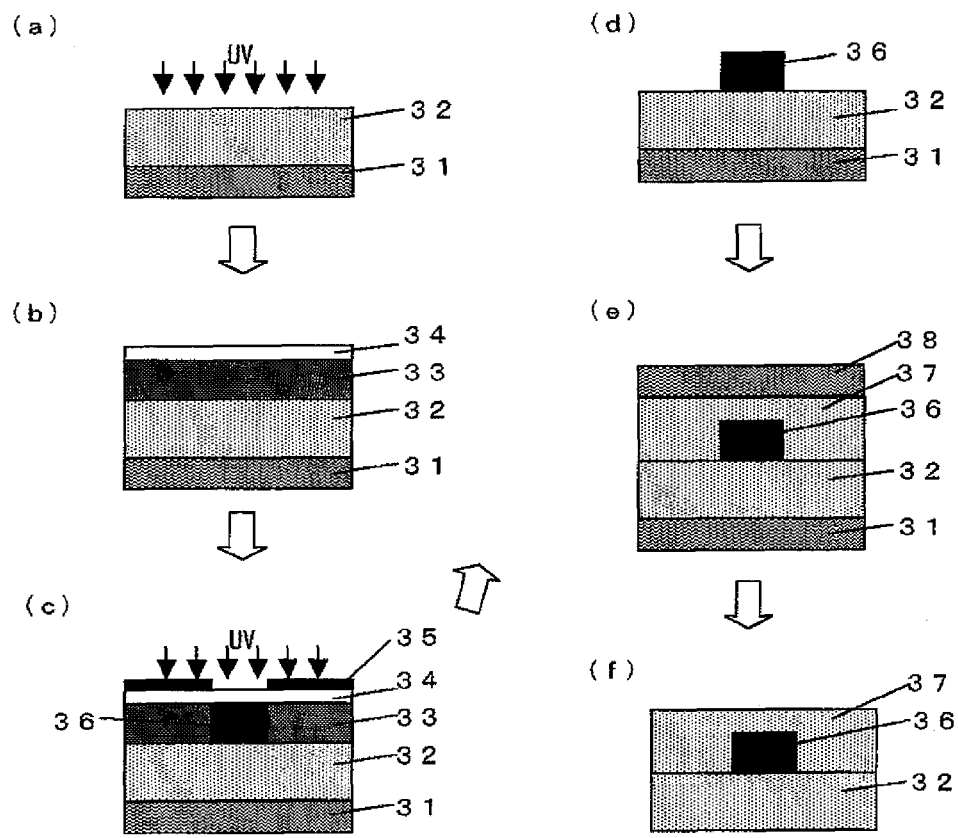

FIG. 6 is a cross-sectional schematic drawing showing one example of steps for preparing an optical waveguide, wherein (a) to (f) are drawings for explaining the respective steps of (a) curing a lower cladding layer, (b) laminating a resin film for forming a core layer, (c) exposure, (d) developing, (e) laminating and curing a resin film for forming an upper cladding layer and (f) peeling a base material film.

Figure 7:
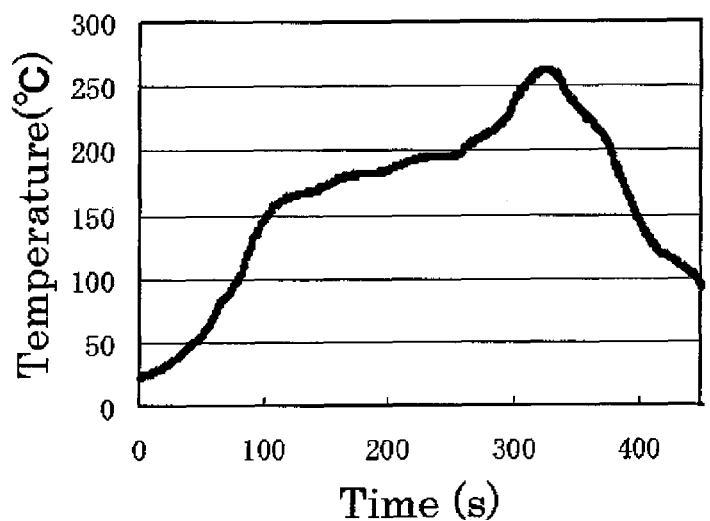

FIG. 7 is a temperature profile of a reflow test which is used for evaluating the adhesive film and the adhesive sheet of the present invention.

Figure 8:
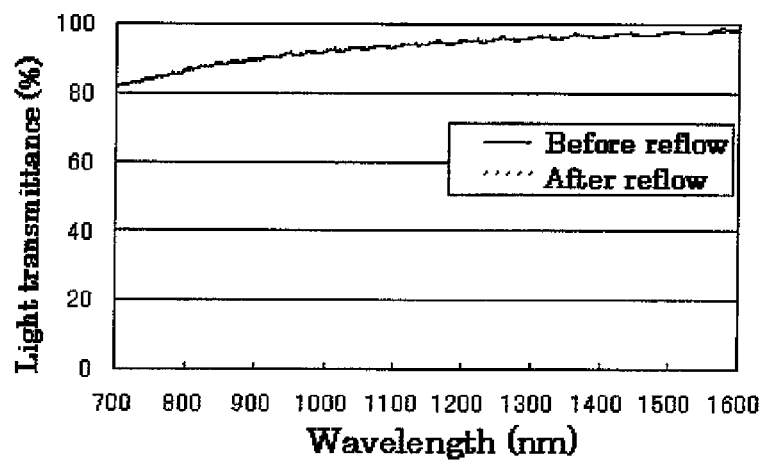

FIG. 8 is a light transmittance of an adhesive film prepared in Example 1-A in a wavelength of 700 to 1600 nm before and after reflow.

Figure 9:
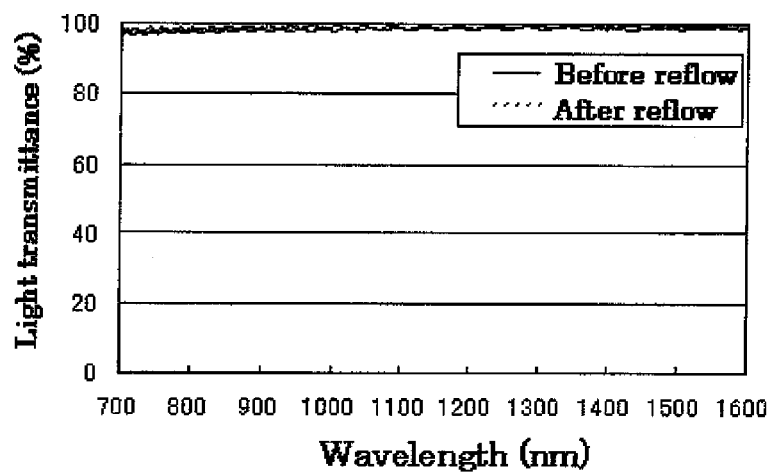

FIG. 9 is a light transmittance of an adhesive sheet prepared in Example 1-B in a wavelength of 700 to 1600 nm before and after reflow.

Figure 10:
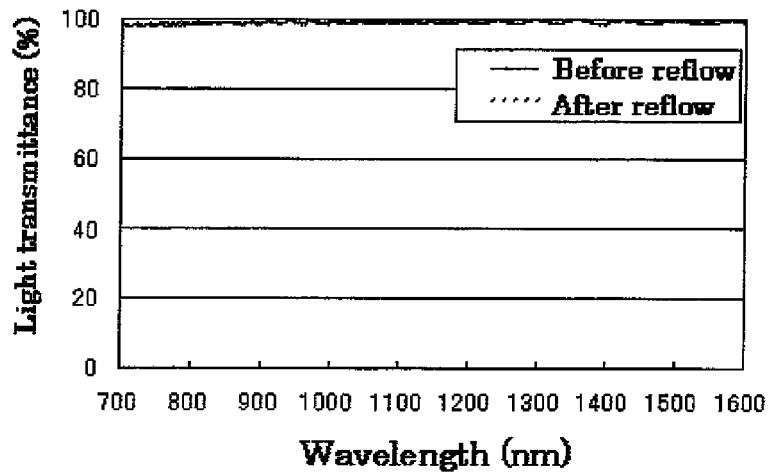

FIG. 10 is a light transmittance of an adhesive sheet prepared in Example 2-B in a wavelength of 700 to 1600 nm before and after reflow.

EXPLANATION of CODES

| | |
|---|---|
| 1: | Adhesive layer |
| 1': | Pressure-sensitive adhesive layer |
| 2: | Supporting film or supporting base material |
| 3: | Protective film |
| 4: | Adhesive film |
| 4': | Adhesive sheet |
| 11: | Optical waveguide |
| 21: | Adherend member |
| 31, 38: | Base material films (for a cladding layer) |
| 32: | Lower cladding layer |
| 33: | Core layer |
| 34: | Base material film (for forming a core part) |
| 35: | Photomask |
| 36: | Core pattern |
| 37: | Upper cladding layer |
| 40: | Optical device |

BEST MODE FOR CARRYING OUT THE INVENTION

The adhesive composition of the present invention for an optical waveguide (hereinafter referred to merely as the adhesive composition) is characterized by comprising (a) the epoxy resin, (b) the curing agent and (c) the high molecular compound, wherein a total light transmittance and a light transmittance in a wavelength of 700 to 1600 nm in a cured matter of the adhesive composition are 80% or more, and the adhesive film of the present invention for an optical waveguide (hereinafter referred to merely as the adhesive film) is characterized by forming the above adhesive composition into a film form.

Further, the adhesive composition of the present invention may comprise a phenol base epoxy resin curing agent as the component (b) and a high molecular compound containing functional group and having a weight average molecular weight of 100,000 or more as the component (c), and it may further comprise (f) a photoreactive monomer in which a cured matter thereof obtained by irradiation with a UV ray has Tg of 250° C. or higher and (g) a photoinitiator generating a base and a radical by irradiation with a UV ray of 200 to 450 nm. The adhesive sheet of the present invention is characterized by comprising the above adhesive composition and a supporting base material.

The present invention shall be explained below in further details.

In the cured matter of the adhesive composition of the present invention, a total light transmittance and a light transmittance in a wavelength of 700 to 1600 nm are 80% or more, and the light transmittance described above after carrying out three times a reflow test at a maximum temperature of 265° C. is preferably 80% or more. If the above light transmittances are 80% or more, the satisfactory transparency can be held, and therefore a lead free reflow process can be applied, so that an applying range of the adhesive composition can be expanded. From the viewpoint described above, the above light transmittances are more preferably 81% or more, further preferably 83% or more and particularly preferably 85% or more. The light transmittance is the total light transmittance and the light transmittance in a wavelength of 700 to 1600 nm and can be measured by a method described in the examples. In an optical interconnection, lasers having a wavelength of 850 to 1300 nm are widely investigated as a light source, and a light transmittance in a near infrared region including the above wavelength is particularly important. The reflow test at a maximum temperature of 265° C. means a lead free solder reflow test carried out on conditions according to IPC/JEDEC J-STD-020B.

In the cured matter of the adhesive composition of the present invention, a change in a refractive index before and after carrying out three times the reflow test at a maximum temperature of 265° C. falls preferably within ±0.005. If a change in the refractive index falls in the above range, the optical stability can be secured, and therefore the lead free reflow process can be applied, so that an applying range of the adhesive composition can be expanded. From the viewpoint described above, a change in the refractive index falls more preferably within ±0.003, further preferably within ±0.001. The refractive index can be measured by a method described in the examples.

In the cured matter of the adhesive composition of the present invention, an evaluation score in an adhesive property which is measured by a cross-cut tape method after carrying out three times the reflow test at a maximum temperature of 265° C. is preferably 8 points or more. If the above evaluation score is 8 points or more, the satisfactory adhesive property can be held, and therefore the lead free reflow process can be applied, so that an applying range of the adhesive composition can be expanded. From the viewpoint described above, the evaluation score of the adhesive property is more preferably 10 points. The cross-cut tape method means a test method for an adhesive property which is carried out according to JIS-K5400.

In the cured matter of the adhesive composition of the present invention, in a dynamic bending endurance test of an optical waveguide provided with an adhesive prepared by using the adhesive composition described above, mechanical breakage is preferably not generated on the optical waveguide after carrying out 100,000 times the bending test at a curvature radius of 5 mm. If mechanical breakage is not generated on the optical waveguide, stable optical transmission can be carried out over a long period of time, and the adhesive composition can be applied to always movable parts such as, for example, hinge parts of portable phones. In order to reduce a size of equipments, no mechanical breakage is required to be generated on optical waveguides even at a smaller curvature radius, and from this point of view, mechanical breakage is not generated at a curvature radius of more preferably 3 mm, further preferably 2 mm. The mechanical breakage can be confirmed by observation under a magnifying glass or a microscope or with eyes.

In this regard, the optical waveguide shall not specifically be restricted as long as it controls transmission, branching, reflection, refraction, amplification and attenuation of light, and it is usually constituted from a core having a high refractive index and a cladding having a low refractive index which covers the core. In the present invention, a polymer optical waveguide having a flexibility is suitably used from the viewpoint that an optical waveguide having a flexibility can be produced.

The respective components shall more specifically be explained below.

The epoxy resin (a) used in the present invention shall not specifically be restricted as long as it is cured to exhibit an adhesive action. An epoxy resin which is difunctional or higher and which has a molecular weight of preferably less than 5000, more preferably less than 3000 can be used. Capable of being used are, for example, difunctional epoxy resins such as bisphenol A type epoxy resins, bisphenol F type epoxy resins and the like, novolac type epoxy resins such as phenol novolac type epoxy resins, cresol novolac type epoxy resins and the like. Further, conventionally known epoxy resins such as polyfunctional epoxy resins, heterocycle-containing epoxy resins and the like can be applied as well.

Capable of being used as the above epoxy resins are, for example, commercially available epoxy resins including bisphenol A type epoxy resins such as Epikote 807, Epikote 815, Epikote 825, Epikote 827, Epikote 828, Epikote 834, Epikote 1001, Epikote 1002, Epikote 1003, Epikote 1055, Epikote 1004, Epikote 1004AF, Epikote 1007, Epikote 1009, Epikote 1003F and Epikote 1004F (trade names, manufactured by Japan Epoxy Resins Co., Ltd.), DER-330, DER-301, DER-361, DER-661, DER-662, DER-663U, DER-664, DER-664U, DER-667, DER-642U, DER-672U, DER-673MF, DER-668 and DER-669 (trade names, manufactured by The Dow Chemical Company), YD8125 and YD8170 (trade names, manufactured by Tohto Kasei Co., Ltd.) and the like, bisphenol F type epoxy resins such as YDF-2004 (trade name, manufactured by Tohto Kasei Co., Ltd.) and the like, phenol novolac type epoxy resins such as Epikote 152 and Epikote 154 (trade names, manufactured by Japan Epoxy Resins Co., Ltd.), EPPN-201 (trade name, manufactured by Nippon Kayaku Co., Ltd.), DEN 438 (trade name, manufactured by The Dow Chemical Company) and the like, cresol novolac type epoxy resins such as Epikote 180S65 (trade name, manufactured by Japan Epoxy Resins Co., Ltd.), Araldite ECN1273, Araldite ECN1280 and Araldite ECN1299 (trade names, manufactured by Ciba Specialty Chemicals K.K), YDCN-701, YDCN-702, YDCN-703 and YDCN-704 (trade names, manufactured by Tohto Kasei Co., Ltd.), EOCN-1025, EOCN-1035, EOCN-1045, EOCN-1012, EOCN-1020, EOCN-1025 and EOCN-1027 (trade names, manufactured by Nippon Kayaku Co., Ltd.), ESCN-195×, ESCN-200L and ESCN-220 (trade names, manufactured by Sumitomo Chemical Co., Ltd.) and the like, polyfunctional epoxy resins such as Epon 1031S, Epikote 1032H60 and Epikote 157S70 (trade names, manufactured by Japan Epoxy Resins Co., Ltd.), Araldite 0163 (trade name, manufactured by Ciba Specialty Chemicals K.K), Denacol EX-611, Denacol EX-614, Denacol EX-614B, Denacol EX-622, Denacol EX-512, Denacol EX-521, Denacol EX-421, Denacol EX-411 and Denacol EX-321 (trade names, manufactured by Japan Nagase Kasei Co., Ltd.), EPPN 501H and EPPN 502H (trade names, manufactured by Nippon Kayaku Co., Ltd.), amine type epoxy resins such as Epikote 604 (trade name, manufactured by Japan Epoxy Resins Co., Ltd.), YH-434 (trade name, manufactured by Tohto Kasei Co., Ltd.), TETRAD-X and TETRAD-C (trade names, manufactured by Mitsubishi Gas Chemical Company, Inc.), ELM-120 (trade name, manufactured by Sumitomo Chemical Co., Ltd.) and the like, heterocycle-containing epoxy resins such as Araldite PT801 (trade name, manufactured by Ciba Specialty Chemicals K.K) and the like and alicyclic epoxy resins such as ERL4234, ERL4299, ERL4221 and ERL4206 (trade names, manufactured by Union Carbide Corporation) and the like. The above epoxy resins can be used alone or in combination of two or more kinds thereof.

In the present invention, an epoxy resin which is a solid matter at room temperature (25° C.) and which has a softening point of 50° C. or higher measured by a ring and ball method is used in a proportion of preferably 20 mass % or more, more preferably 40 mass % or more and further preferably 60 mass % or more based on the whole epoxy resin from the viewpoint of a heat resistance.

The above epoxy resin includes, for example, bisphenol A type epoxy resins, bisphenol F type epoxy resins, bisphenol S type epoxy resins, alicyclic epoxy resins, aliphatic chain epoxy resins, phenol novolac type epoxy resins, cresol novolac type epoxy resins, bisphenol A novolac type epoxy resins, diglycidyl etherified compounds of biphenol, diglycidyl etherified compounds of naphthalenediol, diglycidyl etherified compounds of phenols, diglycidyl etherified compounds of alcohols and alkyl-substituted matters, halides and hydrogenated products of the above compounds. They may be used alone or in combination of two or more kinds thereof, and components other than the epoxy resins may be contained as impurities. A combination of epoxy resins having a large molecular weight and a softening point of 50° C. or higher and epoxy resins in which a difference in a polarity between an epoxy resin and a rubber is large is less liable to be compatible, and therefore they are preferably used.

The epoxy resin is preferably incompatible, as described later, with the high molecular compound, and when two or more kinds of the epoxy resins are used in combination, a mixture thereof is preferably incompatible with the high molecular compound. The compatible epoxy resins may be contained in the above mixture. For example, when an epoxy resin YDCN 703 which has a softening point of 50° C. or higher and which is incompatible by itself is combined with an epoxy resin Epikote 828 which has a softening point of lower than 50° C. and which is incompatible by itself, an epoxy resin mixture obtained by mixing them in a mass ratio of 1:0 to 1:10 becomes incompatible.

The curing agent (b) used in the present invention shall not specifically be restricted and can be used as long as it can cure the epoxy resins. The above curing agent includes, for example, polyfunctional phenols, amines, imidazole compounds, acid anhydrides, organic phosphorus compounds and halides thereof, polyamides, polysulfides, boron trifluoride and the like.

The examples of the polyfunctional phenols include hydroquinone, resorcinol and catechol which are monocyclic difunctional phenols; bisphenol A, bisphenol F, bisphenol S, naphthalenediols, biphenols and halides and alkyl-substituted matters thereof which are polycyclic difunctional phenols. Further, they include phenol resins such as phenol novolac resins which are polycondensation products of the above phenols with aldehydes, resole resins, bisphenol A novolac resins, cresol novolac resins and the like. Preferred phenol resin curing agent which are commercially available include, for example, Phenolite LF2882, Phenolite LF2822, Phenolite TD-2090, Phenolite TD-2149, Phenolite VH4150 and Phenolite VH4170 (trade names, manufactured by Dainippon Ink & Chemicals Inc.).

A phenol resin having a hydroxyl equivalent of 150 g/eq or more is preferably used as the curing agent (b). The above phenol resin shall not specifically be restricted as long as it has the value described above, and the resin of a novolac type or a resole type is preferably used because of an excellent moisture resistance reliability.

The specific example of the phenol resin described above includes, for example, a phenol resin represented by the following Formula (I):

[Formula 2]

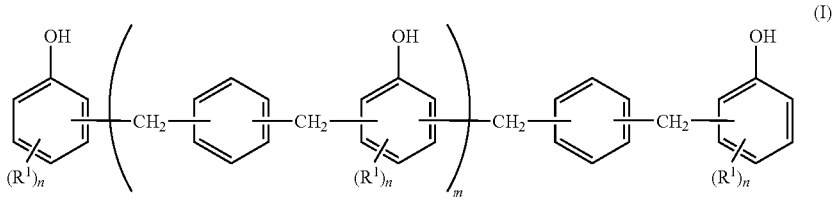

(wherein $R^1$ each may be the same or different and represents a hydrogen atom, a linear or branched alkyl group having 1 to 10 carbon atoms, a cyclic alkyl group, an aralkyl group, an alkenyl group, a hydroxyl group, an aryl group or a halogen atom; n represents an integer of 1 to 3; and m represents an integer of 0 to 50). The above phenol resin shall not specifically be restricted as long as it meets Formula (I), and it has a water absorption coefficient of preferably 2 mass % or less after put in a constant temperature and constant humidity bath at 85° C. and 85% RH for 48 hours from the viewpoint of a humidity resistance.

Further, preferably used is the phenol resin in which a heat weight loss (heating rate: 5° C./minute, atmosphere: nitrogen) at 350° C. measured by means of a thermogravimetric analyzer (TGA) is less than 5%. If the heat weight loss is less than 5%, volatile matters are inhibited in heating and processing, whereby a reliability of various characteristics such as a heat resistance, a moisture resistance and the like is enhanced. Further, the equipments can be reduced in contamination caused by volatile matters produced in working such as heating, processing and the like, and therefore it is preferred.

The phenol resin represented by Formula (I) described above can be obtained, for example, by reacting a phenol compound with a xylylene compound which is a divalent linkage group under the absence of a catalyst or the presence of an acid catalyst. The phenol resin described above includes, for example, Milex XLC series and XL series (trade name, manufactured by Mitsui Chemicals, Inc.).

When the phenol resin represented by Formula (I) described above is used in combination with the epoxy resin, a blending amount thereof is preferably 0.70/0.30 to 0.30/0.70, more preferably 0.65/0.35 to 0.35/0.65, further preferably 0.60/0.30 to 0.30/0.60 and particularly preferably 0.55/0.45 to 0.45/0.55. If the blending ratio falls in the range described above, the adhesive prepared can be improved in a curing property.

The phenol compound used for producing the phenol resin represented by Formula (I) described above includes phenol, o-cresol, m-cresol, p-cresol, o-ethylphenol, p-ethylphenol, o-n-propylphenol, m-n-propylphenol, p-n-propylphenol, o-isopropylphenol, m-isopropylphenol, p-isopropylphenol, o-n-butylphenol, m-n-butylphenol, p-n-butylphenol, o-isobutylphenol, m-isobutylphenol, p-isobutylphenol, octylphenol, nonylphenol, 2,4-xylenol, 2,6-xylenol, 3,5-xylenol, 2,4,6-trimethylphenol, resorcin, catechol, hydroquinone, 4-methoxyphenol, o-phenylphenol, m-phenylphenol, p-phenylphenol, p-cyclohexylphenol, o-allylphenol, p-allylphenol, o-benzylphenol, p-benzylphenol, o-chlorophenol, p-chlorophenol, o-bromophenol, p-bromophenol, o-iodophenol, p-iodophenol, o-fluorophenol, m-fluorophenol, p-fluorophenol and the like. Particularly preferably, it includes phenol, o-cresol, m-cresol, p-cresol and the like.

The above phenol compounds may be used alone or in a mixture of two or more kinds thereof.

Xylylene dihalide, xylylene diglycol and derivatives thereof which are shown below can be used as the xylylene compound which is a divalent linkage group used for producing the phenol resin represented by Formula (I) described above. That is, they include α,α'-dichloro-p-xylene, α,α'-dichloro-m-xylene, α,α'-dichloro-o-xylene, α,α'-dibromo-p-xylene, α,α'-dibromo-m-xylene, α,α'-dibromo-o-xylene, α,α'-diiodo-p-xylene, α,α'-diiodo-m-xylene, α,α'-diiodo-o-xylene, α,α'-dihydroxy-p-xylene, α,α'-dihydroxy-m-xylene, α,α'-dihydroxy-o-xylene, α,α'-dimethoxy-p-xylene, α,α'-dimethoxy-m-xylene, α,α'-dimethoxy-o-xylene, α,α'-diethoxy-p-xylene, α,α'-diethoxy-m-xylene, α,α'-diethoxy-o-xylene, α,α'-di-n-propoxy-p-xylene, α,α'-di-n-propoxy-m-xylene, α,α'-di-n-propoxy-o-xylene, α,α'-di-isopropoxy-p-xylene, α,α'-di-isopropoxy-m-xylene, α,α'-di-isopropoxy-o-xylene, α,α'-di-n-butoxy-p-xylene, α,α'-di-n-butoxy-m-xylene, α,α'-di-n-butoxy-o-xylene, α,α'-diisobutoxy-p-xylene, α,α'-diisobutoxy-m-xylene, α,α'-diisobutoxy-o-xylene, α,α'-di-tert-butoxy-p-xylene, α,α'-di-tert-butoxy-m-xylene, α,α'-di-tert-butoxy-o-xylene and the like. Among them, preferred are α,α'-dichloro-p-xylene, α,α'-dichloro-m-xylene, α,α'-dichloro-o-xylene, α,α'-dihydroxy-p-xylene, α,α'-dihydroxy-m-xylene, α,α'-dihydroxy-o-xylene, α,α'-dimethoxy-p-xylene, α,α'-dimethoxy-m-xylene and α,α'-dimethoxy-o-xylene.

The above xylylene compounds may be used alone or in a mixture of two or more kinds thereof.

When the phenol compound and the xylylene compound each described above are reacted, they are reacted until the xylylene compound which is the raw material substantially disappears at 50 to 250° C. under the presence of an acid catalyst and the reaction composition becomes constant.

The acid catalyst includes mineral acids such as hydrochloric acid, sulfuric acid, phosphoric acid, polyphosphoric acid and the like; organic carboxylic acids such as dimethylsulfuric acid, diethylsulfuric acid, p-toluenesulfonic acid, methanesulfonic acid, ethanesulfonic acid and the like; super-strong acids such as trifluoromethanesulfonic acid and the like; strong acid ion exchange resins such as alkanesulfonic acid type ion exchange resins and the like; superstrong acid ion exchange resins (trade name: Nafion, manufactured by Du Pont Co., Ltd.) such as perfluoroalkanesulfonic acid type ion exchange resins and the like; natural and synthetic zeolites; active white clay (acid white clay) and the like.

The reaction time is, though depending on the raw materials and the reaction temperature, approximately 1 to 15 hours, and practically it may be determined while tracing the reaction composition by means of GPC (gel permeation chromatography). When using exceptionally a halogenoxylene derivative such as α,α'-dichloro-p-xylene, the reaction proceeds under the absence of a catalyst while generating a corresponding hydrogen halide gas, and therefore an acid catalyst is not required. In the other cases, the reaction proceeds under the presence of an acid catalyst to generate corresponding water and alcohol. In a reaction mole ratio of the phenol compound to the xylylene compound, the phenol compound is used usually in excess, and the unreacted phenol compound is recovered after the reaction. In this case, the average molecular weight is determined according to an amount of the phenol compound, and the phenol compound which is present in more excess provides the phenol resin having a lower average molecular weight. The phenol resin in which a phenol compound part is allyphenol can be obtained, for example, by a method in which a phenol resin subjected to no allylation is produced and in which this phenol resin is reacted with allyl halide to turn it into allyl via allyl ether by Claisen transfer.

The examples of the amines include aliphatic or aromatic primary amines, secondary amines, tertiary amines, quaternary ammonium salts, alicyclic amines, guanidines, urea derivatives and the like. The examples of the above compounds include N,N-benzyldimethylamine, 2-(dimethylaminomethyl)phenol, 2,4,6-tris(dimethylaminomethyl)phenol, tetramethylguanidine, triethanolamine, N,N'-dimethylpiperazine, 1,4-diazabicyclo[2,2,2]octane, 1,8-diazabicyclo[5,4,0]-7-undecene, 1,5-diazabicyclo[4,4,0]-5-nonene, hexamethylenetetramine, pyridine, picoline, piperidine, pyrrolidine, dimethylcyclohexylamine, dimethylhexylamine, cyclohexylamine, diisobutylamine, di-n-butylamine, diphenylamine, N-methylaniline, tri-n-propylamine, tri-n-octylamine, tri-n-butylamine, triphenylamine, tetramethylammonium chloride, tetramethylammonium bromide, tetramethylammonium iodide, triethylenetetraamine, diaminodiphenylmethane, diaminodiphenyl ether, dicyanediamide, tolylbiguanide, guanylurea, dimethylurea and the like.

The examples of the imidazole compounds include imidazole, 2-ethylimidazole, 2-ethyl-4-methylimidazole, 2-methylimidazole, 2-phenylimidazole, 2-undecylimidazole, 1-benzyl-2-methylimidazole, 2-heptadecylimidazole, 4,5-diphenylimidazole, 2-methylimidazoline, 2-phenylimidazoline, 2-undecylimidazoline, 2-heptadecylimidazoline, 2-isopropylimidazole, 2,4-dimethylimidazole, 2-phenyl-4-methylimidazoline, benzimidazole, 1-cyanoethylimidazole and the like.

The examples of the acid anhydrides include phthalic anhydride, hexahydrophthalic anhydride, pyromellitic dianhydride, benzophenonetetracarboxylic dianhydride and the like.

The organic phosphorus compounds can be use without providing any specific restrictions as long as they are phosphorus compounds having organic groups, and they include, for example, hexamethylphosphoric triamide, tri(dichloropropyl)phosphate, tri(chloropropyl)phosphate, triphenyl phosphite, trimethyl phosphate, phenylphosphonic acid, triphenylphosphine, tri-n-butylphosphine, diphenylphosphine and the like. The above curing agents can be used alone or in combination.

A blending amount of the above curing agents shall not specifically be restricted as long as they can allow a curing reaction of the epoxy group to proceed, and it falls in a range of preferably 0.01 to 5.0 equivalent, particularly preferably 0.8 to 1.2 equivalent per equivalent of the epoxy group.

In the epoxy resins and the curing agents, those in which a compound having no mutagenicity, for example, bisphenol A is not used are preferred since they exert smaller effect on the environment and the human bodies.

The high molecular compound (c) used in the present invention is preferably incompatible with the epoxy resins from the viewpoints of a low elasticity, an adhesive property and a reliability at high temperature, and it includes, for example, acryl base copolymers, rubbers such as acryl rubber, acrylonitrile butadiene rubber, silicone rubber and the like, silicone resins, silicone-modified resins such as silicone-modified polyamideimide and the like, polyurethane, polyimide, polyimideamide and the like. Incompatibility with the epoxy resin means a property in which the high molecular compound (c) and the epoxy resin are separated into two phases.

The high molecular compound (c) containing a reactive group (functional group) and having a weight average molecular weight of 100,000 or more is preferred.

The reactive group includes, for example, a carboxylic acid group, an acryloyl group, a methacryloyl group, an amino group, a hydroxyl group, an epoxy group such as a glycidyl group, an episulfide group and the like. If the functional group monomer is acrylic acid of a carboxylic acid type among them, cross-linking reaction is liable to proceed, and a reduction in the adhesive strength is brought about in a certain case due to gelation in a varnish state and a rise in the curing degree in a B stage state. Accordingly, glycidyl acrylate or glycidyl methacrylate (hereinafter referred generically to as glycidyl (meth)acrylate) having an epoxy group is more preferably used as a raw material for the high molecular compound from the viewpoint that they are not brought about or a period until bringing about them is long. An epoxy group-containing acryl copolymer having a weight average molecular weight of 100,000 or more is further preferably used as the high molecular compound (c) used in the present invention. The component (c) used in the present invention is obtained by carrying out polymerization in polymerization reaction for obtaining the high molecular compound so that the unreacted monomers remain or can be obtained as well by adding a reactive group-containing monomer after obtaining the high molecular compound. The weight average molecular weight is a styrene-reduced value obtained by using a calibration curve formed with standard polystyrene by a gel permeation chromatographic (GPC) method.

The acryl copolymer includes, for example, (meth)acryl ester copolymers, acryl rubbers and the like, and among them, the acryl rubbers are preferred. The acryl rubbers are rubbers containing acrylic ester as a principal component and comprising mainly a copolymer of butyl acrylate and acrylonitrile and a copolymer of ethyl acrylate and acrylonitrile. The copolymer monomer includes, for example, butyl acrylate, ethyl acrylate, methyl acrylate, methyl methacrylate, acrylonitrile and the like.

The acryl copolymers containing 0.5 to 6 mass % of glycidyl (meth)acrylate as a functional group and having a glass transition temperature (hereinafter abbreviated as Tg) of −50° C. or higher and 30° C. or lower, preferably −10° C. or higher and 30° C. or lower and having a weight average molecular weight of 100,000 or more are particularly preferred since an adhesive property and a heat resistance are high.

The glycidyl group-containing (meth)acryl copolymer containing glycidyl (meth)acrylate as a copolymer monomer component and having a weight average molecular weight of 100,000 or more can be produced as well by suitably selecting a monomer from the monomers described above, or commercial products (for example, HTR-860P-3, HTR-860P-5 and the like, manufactured by Nagase ChemteX Corporation) are available as well.

In the high molecular compound (C), the number of a functional group exerts an effect on a cross-linking density, and therefore an amount of the functional group-containing monomer used as the raw material and an amount of the repetitive unit containing a functional group are contained preferably, though varied depending on the resin used, in a proportion of 0.5 to 6.0 mass % based on the copolymer when the high molecular compound is obtained in the form of a copolymer of plural monomers.

An amount of glycidyl (meth)acrylate used as the copolymer monomer and an amount of the glycidyl group-containing repetitive unit are contained preferably in a proportion of 0.5 to 6.0 mass % based on the copolymer. If they are contained in a proportion of 0.5 mass % or more, the higher adhesive strength can be obtained, and from this point of view, they are contained in a proportion of more preferably 0.8 mass % or more, further preferably 2 mass % or more. On the other hand, if they are contained in a proportion of 6 mass % or less, moderate cross-linking of the glycidyl group takes place, and therefore gelation can be inhibited. From the viewpoint described above, they are contained in a proportion of more preferably 0.5 to 5.0 mass %, further preferably 0.8 to 5.0 mass % based on the copolymer. Alkyl (meth)acrylate having an alkyl group having 1 to 8 carbon atoms and a mixture of styrene and acrylonitrile can be used. Among them, ethyl (meth)acrylate and/or butyl (meth)acrylate are particularly preferred.

The mixing proportion is controlled preferably considering Tg of the copolymer. If Tg is −10° C. or higher, the adhesive layer or the adhesive film in a B stage state can be reduced in a tacking property and improved in a handling property. The polymerization method shall not specifically be restricted and includes, for example, pearl polymerization, solution polymerization and the like, and the copolymer is obtained by these methods.

A weight average molecular weight of the high molecular compound (C) is preferably 100,000 or more, more preferably 300,000 to 3,000,000, further preferably 400,000 to 2,500,000 and particularly preferably 500,000 to 2,000,000. If the weight average molecular weight is 100,000 or more, a strength and a flexibility of the sheet and the film can be enhanced and a tacking property thereof can be inhibited from increasing. On the other hand, if it is 3,000,000 or less, the flow property can be improved, and the following property to irregularities of the adherend can be enhanced.

In a blending amount of the high molecular compound (C), assuming that a total mass of the epoxy resin (a) and the curing agent (b) is set to A and that a mass of the high molecular compound (c) is set to B, a ratio A/B is preferably 0.24 to 1.0. If the above blending proportion is 0.24 or more, a reduction in the elastic modulus and an inhibiting effect of the flow property in molding are obtained. On the other hand, if it is 1.0 or less, the handling property at high temperature can be enhanced.

The adhesive composition of the present invention can be blended further, if necessary, with (d) a filler and/or (e) a curing accelerating agent.

The filler (d) includes inorganic fillers and organic fillers, and the inorganic fillers are preferably added from the viewpoints of enhancing a handling property thereof, improving the thermal conductivity, controlling the melt viscosity and imparting the thixotropic property.

The inorganic filler shall not specifically be restricted and includes, for example, aluminum hydroxide, magnesium hydroxide, calcium carbonate, magnesium carbonate, calcium silicate, magnesium silicate, calcium oxide, magnesium oxide, aluminum oxide, aluminum nitride, aluminum borate whisker, boron nitride, crystalline silica, amorphous silica and the like. They can be used alone or in combination of two or more kinds thereof. Aluminum oxide, aluminum nitride, boron nitride, crystalline silica and amorphous silica are more preferred from the viewpoint of improving the thermal conductivity. Aluminum hydroxide, magnesium hydroxide, calcium carbonate, magnesium carbonate, calcium silicate, magnesium silicate, calcium oxide, magnesium oxide, aluminum oxide, crystalline silica and amorphous silica are more preferred from the viewpoints of controlling the melt viscosity and imparting the thixotropic property.

The organic filler includes various rubber fillers, and they include, for example, acrylonitrile butadiene rubber fillers, silicone rubber fillers and the like. They are effective for enhancing the flexibility at low temperature and providing the low elastic modulus.

The filler (d) has more preferably a contact angle of 100 degrees or less with water. If the contact angle with water is 100 degrees or less, an addition effect of the filler can be enhanced, and if it is 60 degrees or less, particularly an effect of improving the reflow resistance grows high and is further preferred.

The filler (d) has preferably an average particle diameter of 0.005 to 1 μm, more preferably 0.01 to 0.1 μm. If the average particle diameter is 0.005 μm or more, the dispersibility and the fluidity can be improved and if it is 0.1 μm or less, the adhesive property can be improved. A contact angle of the filler with water is measured by the following method. The filler is molded by compression to prepare a flat plate, and a drop of water is fallen thereon to measure an angle at which the drop of water is brought into contact with the flat plate by means of a contact angle meter. An average value obtained by carrying out ten times the above measurement is used as a value of the contact angle.

The above filler includes silica, alumina, antimony oxide and the like. Nano Tek $SiO_2$ (trade name, manufactured by C.I. Kasei Co., Ltd., contact angle: 43 degrees, average particle diameter: 0.012 μm) and Aerosil R972 (trade name, manufactured by Nippon Aerosil Co., Ltd., contact angle: 43 degree, average particle diameter: 0.016 μm) are commercially available as silica; Nano Tek $Al_2O_3$ (trade name, manufactured by C.I. Kasei Co., Ltd., contact angle: 55 degrees, average particle diameter: 0.033 μm) is commercially available as alumina; and PATOX-U (trade name, manufactured by Nihon Seiko Co., Ltd., contact angle: 43 degree, average particle diameter: 0.02 μm) is commercially available as antimony trioxide.

A blending amount of the filler (d) is preferably 1 to 50 parts by mass based on 100 parts by mass of the epoxy resin (a) and the curing agent (b). If this blending amount is 50 parts by mass or less, the adhesive can be reduced in a storage elastic modulus and improved in an adhesive property. From this point of view, this blending amount is more preferably 5 to 40 parts by mass, particularly preferably 10 to 30 parts by mass. However, an exposing light is scattered and reflected in forming an optical waveguide depending on the filler to exert an effect on a resolving property of the optical waveguide in a certain case, and therefore when an optical waveguide is prepared by build-up, this is preferably taken into consideration to suitably control a content of the filler.

The curing accelerating agent (e) shall not specifically be restricted, and for example, tertiary amines, imidazoles, quaternary ammonium salts and the like can be used.

The imidazoles include 2-methylimidazole, 2-ethyl-4-methylimidazole, 1-cyanoethyl-2-phenylimidazole, 1-cyanoethyl-2-phenylimidazolium trimellitate and the like. They can be used alone or in combination of two or more kinds thereof. For example, 2E4MZ, 2PZ-CN and 2PZ-CNS (trade names, manufactured by Shikoku Chemicals Corporation) are commercially available as the imidazoles.

The curing accelerating agent has preferably a potential from the viewpoint that the film is extended in a use period. The representative examples thereof include dicyandiamide, dihydrazide compounds such as adipic dihydrazide and the like, guanamic acid, melamic acid, addition compounds of epoxy compounds and imidazole compounds, addition compounds of epoxy compounds and dialkylamines, addition compounds of amines and thiourea, addition compounds of amines and isocyanates and the like. The curing accelerating agent assumes preferably a structure of an adduct type from the viewpoint that the activity at room temperature (25° C.) can be reduced.

A blending amount of the curing accelerating agent (e) is preferably 5.0 parts by mass or less, more preferably 0.05 to 3.0 parts by mass and further preferably 0.2 to 3.0 parts by mass based on total 100 parts by mass of the epoxy resin (a) and the curing agent (b). If this blending amount is 5.0 parts by mass or less, the storage stability is improved, and the good pot life is obtained.

A high molecular weight resin which is compatible with the epoxy resin can be further added to the adhesive composition of the present invention from the viewpoint of enhancing the flexibility and the reflow cracking resistance. The high molecular weight resin which is compatible with the epoxy resin shall not specifically be restricted, and capable of being used are, for example, phenoxy resins, high molecular weight epoxy resins, extra high molecular weight epoxy resins, functional group-containing rubbers having a high polarity, functional group-containing reactive rubbers having a high polarity and the like.

Phenotohto YP-40 and Phenotohto YP-50 (trade names, manufactured by Tohto Kasei Co., Ltd.), PKHC, PKHH and PKHJ (trade names, manufactured by Phenoxy Associate Co., Ltd.) are commercially available as the phenoxy resin.

The high molecular weight epoxy resin includes high molecular weight epoxy resins having a molecular weight of 30,000 to 80,000 and extra high molecular weight epoxy resins having a molecular weight of exceeding 80,000 (refer to Japanese Patent Publication No. 59617/1995, Japanese Patent Publication No. 59618/1995, Japanese Patent Publication No. 59619/1995, Japanese Patent Publication No. 59620/1995, Japanese Patent Publication No. 64911/1995 and Japanese Patent Publication No. 68327/1995).

In the case of the functional group-containing reactive rubbers having a high polarity, PNR-1 (trade name, manufactured by JSR Corporation) is commercially available as carboxyl group-containing acrylonitrile butadiene rubber.

A blending amount of the high molecular weight resin which is compatible with the epoxy resin is preferably 40 parts by mass or less per 100 parts by mass of the epoxy resin. If it is 40 parts by mass or less, Tg of the epoxy resin layer can be enhanced.

Various coupling agents can be further added to the adhesive composition of the present invention from the viewpoint of improving an interfacial bond between different kinds of the materials.

The coupling agents include silane base, titanium base and aluminum base coupling agents, and the silane base coupling agents are most preferred.

The silane base coupling agents shall not specifically be restricted, and capable of being used are, for example, vinyltrichlorosilane, vinyltris(β-methoxyethoxy)silane, vinyltriethoxysilane, vinyltrimethoxysilane, γ-methacryloxypropyltrimethoxysilane, γ-methacryloxypropylmethyldimethoxysilane, β-(3,4-epoxycyclohexyl)ethyltrimethoxysilane, γ-glycidoxypropyltrimethoxysilane, γ-glycidoxypropylmethyldimethoxysilane, γ-glycidoxypropylmethyldiethoxysilane, N-β-(aminoethyl)-γ-aminopropyltrimethoxysilane, N-β-(aminoethyl)-γ-aminopropylmethyldimethoxysilane, γ-aminopropyltriethoxysilane, N-phenyl-γ-aminopropyltrimethoxysilane, γ-mercaptopropyltrimethoxysilane, γ-mercaptopropyltriethoxysilane, 3-aminopropylmethyldiethoxysilane, 3-ureidopropyltriethoxysilane, 3-ureidopropyltrimethoxysilane, 3-aminopropyltrimethoxysilane, 3-aminopropyl-tris(2-methoxy-ethoxy-ethoxy)silane, N-methyl-3-aminopropyltrimethoxysilane, triaminopropyl-trimethoxysilane, 3-(4,5-dihydro)imidazole-1-yl-propyltrimethoxysilane, 3-methacryloxypropyl-trimethoxysilane, 3-mercaptopropyl-methyldimethoxysilane, 3-chloropropyl-methyldimethoxysilane, 3-chloropropyl-dimethoxysilane, 3-cyanopropyl-triethoxysilane, hexamethyldisilazane, N,O-bis(trimethylsilyl)acetamide, methyltrimethoxysilane, methyltriethoxysilane, ethyltrichlorosilane, n-propyltrimethoxysilane, isobutyltrimethoxysilane, amyltrichlorosilane, octyltriethoxysilane, phenyltrimethoxysilane, phenyltriethoxysilane, methyltri(methacryloyloxyethoxy)silane, methyltri(glycidyloxy)silane, N-β-(N-vinylbenzylaminoethyl)-γ-aminopropyltrimethoxysilane, octadecyldimethyl[3-(trimethylsilyl)propyl]ammonium chloride, γ-chloropropylmethyldichlorosilane, γ-chloropropylmethyldimethoxysilane, γ-chloropropylmethyldiethoxysilane, trimethylsilylisocyanate, dimethylsilylisocyanate, methylsilyltriisocyanate, vinylsilyltriisocyanate, phenylsilyltriisocyanate, tetraisocyanatesilane, ethoxysilane isocyanate and the like. They can be used alone or in combination of two or more kinds thereof.

The titanium base coupling agents shall not specifically be restricted, and capable of being used are, for example, isopropyltrioctanoyl titanate, isopropyldimethacrylisostearoyl titanate, isopropyltridecylbenzenesulfoyl titanate, isopropylisostearoyldiacryl titanate, isopropyltri(dioctyphosphate) titanate, isopropyltricumylphenyl titanate, isopropyltris(dioctylpyrophosphate) titanate, isopropyltris(n-aminoethyl) titanate, tetraisopropylbis(dioctylphosphite) titanate, tetraoctylbis(ditridecyphosphite) titanate, tetra(2,2-diallyloxymethyl-1-butyl)bis(ditridecyl)phosphite titanate, dicumylphenyloxyacetate titanate, bis(dioctylpyrophosphate)oxyacetate titanate, tetraisopropyl titanate, tetra-n-butyl titanate, butyl titanate dimer, tetra(2-ethylhexyl) titanate, titanium acetylacetonate, polytitanium acetylacetonate, titanium octylene glycolate, a titanium lactate ammonium salt, titanium lactate, titanium lactate ethyl ester, titanium ethanol aminate, polyhydroxytitanium stearate, tetramethyl orthotitanate, tetraethyl orthotitanate, tetrapropyl orthotitanate, tetraisobutyl orthotitanate, stearyl titanate, a cresyl titanate monomer, a cresyl titanate polymer, diisopropoxy-bis(2,4-pentadionate) titanium (IV), diisopropyl-bis-triethanolamino titanate, octylene glycol titanate, a tetra-n-butoxytitanium polymer, a tri-n-butoxytitanium monostearate polymer, tri-n-butoxytitanium monostearate and the like. They can be used alone or in combination of two or more kinds thereof.

The aluminum base coupling agents shall not specifically be restricted, and capable of being used are, for example, aluminum chelate compounds such as ethylacetoacetate aluminum diisopropylate, aluminum tris(ethylacetoacetate), alkylacetoacetate aluminum diidopropylate, aluminum monoacetylacetoacetate bis(ethylacetoacetate), aluminum tris(acetylacetonate),
aluminum•monoisopropoxymonooleoxyethyl acetoacetate, aluminum di-n-butoxide monoethylacetoacetate, aluminum diisopropoxide monoethylacetoacetate and the like, aluminum alcolates such as aluminum isopropylate, mono-sec-butoxyaluminum diisopropylate, aluminum sec-butylate, aluminum ethylate and the like. They can be used alone or in combination of two or more kinds thereof.

A blending amount of the coupling agent is preferably 10 parts by mass or less based on total 100 parts by mass of the epoxy resin (a) and the curing agent (b) from the viewpoints of effects thereof, a heat resistance and a cost.

Further, the adhesive composition of the present invention can be blended with an ion scavenger from the viewpoint of adsorbing ionic impurities to enhance a moisture resistance reliability.

The ion scavenger shall not specifically be restricted, and capable of being used are compounds known as a copper inhibitor for inhibiting copper from being ionized and eluted, for example, triazinethiol compounds, bisphenol base reducing agents and the like, and inorganic ion adsorbents such as zirconium base and antimony bismuth base magnesium aluminum compounds and the like can be used as well. A blending amount of the ion scavenger is preferably 10 parts by mass or less based on 100 parts by mass of the adhesive composition from the viewpoints of effects obtained by adding, a heat resistance and a cost.

The cured matter of the adhesive composition of the present invention has preferably a tensile elastic modulus of 1 to 20 MPa at 240° C. If the above tensile elastic modulus is 20 MPa or less, the stress relaxation property can be enhanced to make warping less liable to be brought about. On the other hand, if it is 1 MPa or more, generation of reflow cracks can be reduced.

The tensile elastic modulus at 240° C. is measured in the following manner. First, the adhesive composition having an initial length of 20 mm (L) and a thickness of about 50 µm is cured at 170° C. for one hour to prepare a cured film. This cured film put in a constant temperature of 240° C. in the state that a fixed load of 1 to 10 kg (W) is applied on the cured film. After putting, the temperature of the cured film reaches 240° C., and then an elongation ($\Delta L$) and a cross-sectional area (S) of the cured film are determined to calculate a tensile elastic modulus (E') from the following equation:

$$E'=(L \times W)/(\Delta L \times S)$$

The cured matter of the adhesive composition of the present invention has preferably a storage elastic modulus of 1 to 20 MPa at 240° C. The adhesive composition having the above characteristic is achieved, for example, by the composition comprising the epoxy resin and the curing agent therefor, the high molecular compound which is incompatible with them, the filler and the curing accelerating agent. In particular, the composition containing the filler is preferred, and the composition containing the filler having an average particle diameter of 0.005 to 0.1 µm is particularly preferred.

A weight loss observed when the adhesive composition of the present invention is heated at 270° C. is preferably 2% or less, more preferably 1.5% and further preferably 1%. If weight loss in heating is 2% or less, contamination of peripheral equipments can be reduced in use thereof.

Next, the adhesive composition suited to the adhesive film of the present invention and use of the above adhesive film shall be explained.

In the adhesive composition and the adhesive film of the present invention, the components are separated preferably into two phases in a cross section of the cured matter thereof. The two phases herein referred to mean that the cured matter assumes a sea/island structure.

The sea/island structure means that when a cross section of the adhesive composition staying in a cured state is polished and observed under a scanning electron microscope, an observed image has an uneven structure, as described at page 16 of "Polymer New Material one point polymer alloy" edited by Kyoritu Shuppan, comprising a continuous phase (referred to as "sea") and a dispersion phase (referred to as "island").

The adhesive composition and the adhesive film having the above characteristic are achieved, for example, by the composition comprising the epoxy resin and the curing agent therefor, the high molecular compound which is incompatible with them, for example, allyl rubber, acrylonitrile butadiene rubber, silicone rubber, polyurethane, polyimide, polyamide-imide and the like, a copolymer or a mixture thereof and, if necessary, the filler and/or the curing accelerating agent or a film-shaped matter (adhesive film) thereof.

From the viewpoint of enhancing an adhesive property between the sea phase and the island phase, a peripheral length S of the island phase to a cross-sectional area V satisfies preferably $S/(V^{1/2})>4.0$, more preferably $S/(V^{1/2})>3.6$. The adhesive composition and the adhesive film having the above characteristic are achieved, for example, by the composition comprising the epoxy resin and the curing agent therefor, the high molecular compound which is incompatible with them, for example, a phenoxy resin and the like, the filler and the curing accelerating agent or a film-shaped matter (adhesive film) thereof. In particular, the composition containing the filler is preferred, and the composition containing the filler having an average particle diameter of 0.005 to 0.1 µm is particularly preferred. The filler is preferably silica in which a surface is coated with an organic matter.

The cured matter of the adhesive composition or the adhesive film of the present invention has preferably pores, and the pores have preferably an average diameter thereof of 0.01 to 2 µm and a volume content thereof of 0.1 to 20% by volume. The above cured matter has pores having an average diameter thereof of more preferably 0.03 to 0.1 µm. The pores mean voids, spaces, apertures and the like, and an average diameter of the pores means a diameter of a sphere reduced approximately from a volume of the pores. If an average diameter of the pores falls in the range described above, the PCT resistance (adhesive strength) can be enhanced.

If the pores have a volume content of 0.1% by volume or more, a presence effect of the pores is obtained, and the PCT resistance can be enhanced. If the volume content is 20% by volume or less, the reflow resistance and the PCT resistance can be enhanced. More preferably, the pores are evenly dispersed.

The volume content of the pores can be measured and calculated by the following method.

(1) A place which has a square area comprising an edge having a length as large as 100 times an average particle diameter of the filler used and in which 50 pores are present is set under a scanning electron microscope (SEM).

(2) The square area and an area of 50 pores are determined by the following method. A transparent film which is even in a density and a film thickness is put on an SEM photograph to trace all the fifty pores along the forms thereof with a pen, and then the traced parts are cut off.

(3) Fixed area parts (including the parts of 50 pores) are traced with a pen in the same manner as in (2), and then the traced parts are cut off.

(4) The masses of the traced parts cut off in (2) and (3) are measured to determine (2)/(3).

(5) $V=[(2)/(3)]^{3/2}$ is determined.

(6) The operations of (1) to (5) are repeated five times, and the average value of V thus obtained is set to the volume content.

The adhesive composition and the adhesive film of the present invention comprise a cured matter of the adhesive composition containing the epoxy resin (a), the curing agent (b), the high molecular compound (c) and, if necessary, the filler (d) and the curing accelerating agent (e), and it may be a cured matter which has pores having an average diameter of 0.01 to 2 µm and in which the pores have a volume content of 0.1 to 20% by volume.

The adhesive composition of the present invention can be used to prepare an adhesive film in which a reduction amount in flow is 50% or less at 60° C. after 72 hours. If a reduction amount in flow of the adhesive film is 50% or less, the adhesive film is extended in a storage period at 25° C. or 5° C. and can be stored over a long period of time, and therefore it is preferred.

A reduction amount in flow can be measured by the following procedure.

First, the adhesive film punched in a size of 1 cm×2 cm is pressed on the conditions of 160° C., 1 MPa and 18 seconds. The respective four samples are measured at two points for a length of the samples protruded from the end part under an optical microscope to determine an average length, and this is set to the flow amount. A reduction amount in flow at 60° C. after 72 hours is determined from the initial flow amount F (0) and the flow amount F (72) at 60° C. after 72 hours according to the following equation.

Reduction amount (%) in flow=$(F(0)-F(72))/F(0) \times 100$

The adhesive film of the present invention comprises a cured matter of the adhesive composition containing the epoxy resin (a), the curing agent (b), the high molecular compound (c), the filler (d) and the curing accelerating agent (e), and the components of (a) to (e) described above satisfy preferably a relationship of:

$$0.75 > a/b$$

wherein a represents a contact angle of the filler (d) with water, and b represents a contact angle of a matter obtained by coating and drying a blended matter of (a), (b), (c) and (e) with water.

The adhesive film having the above characteristic is achieved, for example, by the composition comprising the epoxy resin and the curing agent therefor, the high molecular compound which is incompatible with them, for example, allyl rubber, acrylonitrile butadiene rubber, silicone rubber, polyurethane, polyimide, polyamideimide and the like, a copolymer or mixture thereof and, if necessary, the filler and/or the curing accelerating agent or a film-shaped matter (adhesive film) thereof. In particular, it is achieved by the adhesive film comprising the epoxy resin, the curing agent therefor, the epoxy group-containing acryl copolymer containing 1.5 to 2.0% by mass of glycidyl (meth)acrylate, which is incompatible with them and has a weight average molecular weight of 100,000 or more, the filler and the curing accelerating agent. In particular, the epoxy resin having a softening point of 50° C. or higher is preferably used. Further, the curing agent is preferably the phenol resin represented by Formula (I) described above.

In the adhesive film of the present invention, the components of (a) to (e) described above are preferably selected so that a relationship of 0.75>a/b (wherein a and b are the same as described above) is satisfied after the adhesive composition is coated and dried.

The relationship of 0.75>a/b is preferred, that is, a/b is preferably less than 0.75, more preferably less than 0.66 and particularly preferably less than 0.50. A lower limit of a/b is about 0.25.

If a/b is less than 0.75, the adhesive property after absorbing moisture can be enhanced. A contact angle a of the filler with water is measured by the method described above. A contact angle b of a matter obtained by coating and drying a blended matter of (a), (b), (c) and (e) with water is measured as well in the same manner.

The adhesive composition and the adhesive film of the present invention have a blending proportion of the components (a) to (e) as shown below:

(a) the total of the epoxy resin and the curing agent (b): 17.0 to 49.5% by mass,
(c) the high molecular compound: 50.0 to 70.0% by mass,
(d) the filler: 0.45 to 10.0% by mass and
(e) the curing accelerating agent: 0.05 to 3.0% by mass If the total blending amount of the epoxy resin (a) and the curing agent (b) is 17.0% by mass or more, the adhesive property, the molding property (flow property) and the like are satisfactory. On the other hand, if it is 49.5% by mass or less, the elastic modulus is not too high. In this regard, a ratio ((a):(b)) of (a) the epoxy resin to (b) the curing agent is preferably 33:67 to 75:25. If (a) the epoxy resin is too large in the above ratio, the heat resistance, the molding property (flow property) and the like tend to be unsatisfactory. On the other hand, if the curing agent (b) is too large, the molding property (flow property) and the like tend to be unsatisfactory. Use of the composition blended in the ratio described above makes it possible to obtain the adhesive film which is excellent in a heat resistance after absorbing moisture, a reflow resistance, an adhesive property after absorbing moisture and the like.

The adhesive film of the present invention comprises preferably the adhesive composition in which assuming that a total mass of the epoxy resin (a) and the phenol resin (b) represented by Formula (I) described above is set to A and that a mass of the high molecular compound (c) comprising 0.5 to 6% by mass of a reactive group-containing monomer and having a weight average molecular weight of 100,000 or more is set to B, a ratio A/B thereof is 0.24 to 1.0.

The adhesive composition of the present invention can be used to prepare an adhesive film which comprises a laminated cured matter of the above adhesive composition and a polyimide film and in which the above laminated cured matter has a peeling strength of 50N/m or more measured at 240° C.

Also, the above laminated cured matter can be used to prepare an adhesive film in which peeling having a diameter of 2 mm or more is not brought about in the above laminated cured matter in heat treatment at 260° C. for 120 seconds after moisture absorbing treatment.

Further, the adhesive composition of the present invention can be used to prepare an optical device in which peeling having a diameter of 1 mm or more is not brought about between the adhesive layer and the optical waveguide when allowed to pass through a reflow furnace of 260° C. for 120 seconds after moisture absorbing treatment at 85° C. and a relative humidity (RH) of 85% for 168 hours.

The adhesive film and the optical device each described above are achieved, for example, by the composition comprising the epoxy resin and the curing agent therefor, the high molecular compound which is preferably incompatible with them and has a cross-linkable functional group and, if necessary, the filler and/or the curing accelerating agent or a film-shaped matter thereof and an optical device prepared by applying them to an optical waveguide. In particular, they are achieved by the adhesive film comprising the epoxy resin, the curing agent therefor, the epoxy group-containing acryl copolymer containing 1.5 to 6.0% by mass of glycidyl (meth)acrylate, which is incompatible with them and has a weight average molecular weight of 100,000 or more, the filler and the curing accelerating agent. In particular, the epoxy resin having a softening point of 50° C. or higher is preferably used.

Further, the curing agent is preferably the phenol resin represented by Formula (I) described above. In particular, the filler having an average particle diameter of 0.005 to 0.1 μm is preferably contained therein. Further, the filler is preferably silica in which a surface is coated with an organic matter.

The adhesive composition of the present invention is provided with an excellent moisture absorption resistant characteristic by using the low moisture-absorbing phenol resin represented by Formula (I), an excellent reflow crack resistant characteristic by using the acryl copolymer containing a reactive group-containing monomer to form a suitable cross-linking structure and an excellent reflow crack resistant characteristic and an excellent heat resistant characteristic by using the acryl copolymer which is incompatible with the epoxy resin to thereby form a clear sea-island structure after cured. Further, addition of the inorganic filler enhances the high temperature elastic modulus and the high temperature peeling strength and exerts the reflow crack preventing effect to make it possible to obtain the adhesive composition which is excellent in a reflow crack resistance.

Figure 1:
FIG. 1 is a cross-sectional schematic drawing showing the adhesive film of the present invention.

The adhesive film of the present invention is obtained in the form of an adhesive layer 1 formed on a supporting film 2 by dissolving or dispersing the adhesive composition of the present invention in a solvent such as methyl ethyl ketone, toluene, cyclohexane and the like to prepare a vanish, coating it on a supporting film such as a polytetrafluoroethylene film, a polyethylene terephthalate film subjected on a surface to die releasing treatment and the like, heating and drying to remove the solvent. Further, a protective film 3 may be provided if necessary (refer to FIG. 1). In this case, the heating conditions are preferably, for example, 10 minutes to 20 hours at 80 to 250° C.

Capable of being used as the supporting film described above are plastic films such as a polytetrafluoroethylene film, a polyethylene terephthalate film, a polyethylene film, a polypropylene film, a polymethylpentene film, a polyimide film and the like, and the above plastic films which are subjected on a surface to releasing treatment can be used as well. The supporting film can be peeled off in use to use only the adhesive layer or can be removed after use with the supporting film.

Publicly known methods can be used as a method for coating the vanish on the supporting film and include, for example, a knife coating method, a roll coating method, a spray coating method, a gravure coating method, a bar coating method, a curtain coating method and the like.

A thickness of the adhesive layer (that is, the adhesive film) shall not specifically be restricted, and it is preferably 3 to 100 μm, more preferably 5 to 50 μm, further preferably 7 to 25 μm and particularly preferably 9 to 15 μm. If it is 3 μm or more, the stress relaxation effect is satisfactory, and a thickness of 100 μm or less is economical and can enhance the light transmittance.

The solvent used for preparing the vanish described above shall not specifically be restricted, and considering a volatility in preparing the film, preferably used are solvents having a relatively low boiling point such as methyl ethyl ketone, acetone, methyl isobutyl ketone, 2-ethoxyethanol, toluene, xylene, butyl cellosolve, methanol, ethanol, 2-methoxyethanol and the like. Further, solvents having a relatively high boiling point such as dimethylacetamide, dimethylformamide, N-methylpyrrolidone, cyclohexanone and the like can be used as well for the purpose of enhancing the film coating property.

In producing the vanish when adding the filler to the adhesive composition of the present invention, a stone mill, three rolls, a ball mill, a bead mill and the like are preferably used considering a dispersibility of the filler, and they can be used as well in combination. Further, time for mixing can be shortened by mixing the filler in advance with a low molecular compound and then blending the mixture with a high molecular compound. Also, air bubbles contained in the vanish are preferably removed by vacuum deaeration and the like after preparing the vanish.

In the present invention, when adding the filler to the adhesive composition, preferably employed is a method in which the epoxy resin and the curing agent are mixed with the filler and in which the mixture thereof is then mixed with rubber such as acryl rubber and the like as the high molecular compound incompatible preferably with the epoxy resin to thereby produce the adhesive composition. A film of the epoxy resin is formed on an interface of the filler by the above method, and therefore a lot of the filler remains in the epoxy resin phase even after the rubber and the epoxy resin are subjected to phase separation and cured. A reinforcing effect of an interface between the epoxy resin and the filler is increased, and the heat resistance is enhanced. A ratio VA/VB of a volume VA of the filler contained in the epoxy resin phase after curing to a volume VB of the filler contained in the phase of the rubber component is preferably 1.2 or more. If VA/VB is 1.2 or more, a reinforcing effect of the interfaces A and B is obtained, and the heat resistance can be enhanced. VA/VB is particularly preferably 2 or more, further preferably 4 or more. VA/VB can be measured by the following procedure. A broken surface of the film is observed under a scanning electron microscope, and peaks of atoms forming the filler in regions comprising A and B as principal components are measured respectively by means of XMA. VA/VB is determined by a ratio of the heights of the peaks.

Two or more adhesive layers in the adhesive film of the present invention can be stuck in order to obtain a desired thickness. In this case, the sticking conditions on which the adhesive layers are not peeled off from each other are necessary.

Next, the adhesive sheet of the present invention and the adhesive composition suitably used for the application of the above adhesive sheet shall be explained.

The adhesive composition suitably used for the adhesive sheet of the present invention is preferably a pressure-sensitive adhesive resin composition, and to be specific, it comprises preferably (a) an epoxy resin, (b) a phenol base epoxy resin curing agent, (c) a high molecular compound containing a functional group and having a weight average molecular weight of 100,000 or more, (f) a photoreactive monomer in which a cured matter obtained by irradiation with a UV ray has Tg of 250° C. or higher (hereinafter referred to as the photoreactive monomer) and (g) a photoinitiator generating a base and a radical by irradiation with a UV ray having a wavelength of 200 to 450 nm (hereinafter referred to as the optical base generating agent). The above pressure-sensitive adhesive resin composition is a concept included in the adhesive composition of the present invention, and the pressure-sensitive adhesive layer is formed on a supporting base material to constitute the adhesive sheet of the present invention. In this connection, the pressure-sensitive adhesive layer is provided with a property having in combination both functions comprising a property as the adhesive layer described above and a property as the pressure-sensitive adhesive layer which reduces a close adhesive strength of an interface between the pressure-sensitive adhesive layer and the base material by a method such as irradiation with a radial ray.

The pressure-sensitive adhesive resin composition and the adhesive sheet each described above have the following advantages. That is:

(1) the epoxy resin (a) and the high molecular compound (c) are preferably incompatible with each other and liable to assume a so-called sea-island structure, and the low elastic modulus, the adhesive property, the workability and the reliability at high temperature are obtained, (2) the phenol base epoxy resin curing agent (b) and the photoreactive monomer (f) are used, whereby they are excellent in a heat resistance and a reflow resistance and (3) the optical base generating agent (g) is used under the presence of the phenol base epoxy resin curing agent (b) and the photoreactive monomer (f), and therefore the epoxy resin (a) and the photoreactive monomer (f) are scarcely reacted in a state in which light is not present, so that they are excellent in a storage stability; in addition thereto, if irradiated with light, photoreaction is accelerated, and a curing accelerating agent of the epoxy resin is produced, so that curing of the epoxy resin is accelerated by heating. Thus, the pressure-sensitive adhesive resin composition and the adhesive sheet in which a reactivity is consistent with a storage stability can be obtained.

The respective components contained in the pressure-sensitive adhesive resin composition described above shall be explained below.

The same compounds as described above can be used as the epoxy resin (a) and the high molecular compound (c). The polyfunctional phenols shown above as the examples can also be used as the phenol base epoxy resin curing agent (b).

A blending amount of the epoxy resin (a) is preferably 5 to 250 parts by mass based on 100 parts by mass of the high molecular compound (c). If a blending amount of the epoxy resin (a) falls in the above range, the elastic modulus and an inhibition in the flow property in molding can be secured, and the handling property at high temperature is sufficiently obtained as well. A blending amount of the epoxy resin (a) is more preferably 10 to 100 parts by mass, particularly preferably 20 to 50 parts by mass.

A blending amount of the phenol base epoxy resin curing agent (b) falls in a range of 0.5 to 1.5, preferably 0.8 to 1.2 in terms of an equivalent ratio of a phenolic hydroxyl group per one epoxy group of the epoxy resin (a) from the viewpoint of imparting the humidity resistance reliability. If the equivalent ratio falls in the above range, the resin is sufficiently cured (cross-linked), and the cured matter can be improved in a heat resistance and a humidity resistance.

The photoreactive monomer (f) used in the present invention can enhance a heat resistance of the adhesive sheet described later after irradiated with a UV ray and can improve a thermal time adhesive strength and a reflow resistance thereof.

Tg of the photoreactive monomer (f) is measured by a method in which a cured matter obtained by adding the optical base generating agent to the photoreactive monomer (f) and irradiating with a UV ray is molded into a size of about 5×5 mm to prepare a sample and in which the sample prepared is measured in a compression mode by means of EXSTRA6000 manufactured by Seiko Instruments Inc. to determine Tg. If Tg is 250° C. or higher, the cured matter is excellent in a heat resistance and can stand heat of 250° C. in evaluating a reflow crack resistance. Accordingly, it is excellent in a reflow crack resistance. Tg is more preferably 260° C. or higher which meets a lead free solder. If Tg is too high, the adhesive sheet tends to be inferior in a sticking property at room temperature after irradiated with a UV ray, and therefore an upper limit thereof is preferably 350° C.

The specific examples of the photoreactive monomer (f) include, for example, polyfunctional acrylates such as pentaerythritol triacrylate, dipentaerythritol hexaacrylate, dipentaerythritol pentaacrylate, trimethylolpropane triacrylate, isocyanuric acid ethylene oxide (EO)-modified triacrylate, ditrimethylolpropane tetraacrylate, pentaerythritol tetraacrylate and the like. The above photoreactive monomers can be used alone or in combination of two or more kinds thereof. Among the polyfunctional acrylates, dipentaerythritol hexaacrylate and dipentaerythritol pentaacrylate are preferred from the viewpoint of the residual monomers after irradiated with a UV ray. To be specific, A-DPH, A-9300 and the like (trade names, manufactured by Shin-Nakamura Chemical Co., Ltd.) are available.

When plural photoreactive monomers (f) are used, Tg thereof is Tg obtained by measuring the mixture thereof by the measuring method described above, and Tg of the respective monomers does not have to be 250° C. or higher.

A blending amount of the photoreactive monomer (f) in the present invention is preferably 5 to 100 parts by mass based on 100 parts by mass of the high molecular compound (c). If the above blending amount is 5 parts by mass or more, the photoreactive monomer is liable to be subjected to polymerization reaction by irradiation with a UV ray, and therefore a peeling property of the adhesive sheet from the supporting base material tends to be enhanced. On the other hand, if it is 100 parts by mass or less, a low elastic modulus of the high molecular compound functions, and the film does not become fragile. In addition, the cured matter tends to be improved in a heat resistance and a moisture resistance. Accordingly, the blending amount is more preferably 10 to 70 parts by mass, particularly preferably 20 to 50 parts by mass.

The optical base generating agent (g) used in the present invention is usually called an α-aminoketone compound. Such compound is described in J. Photopolym. Sci. Technol., Vol. 13, No. 12001 and the like, and it is reacted by irradiating with a UV ray according to the following formula:

[Formula 3]

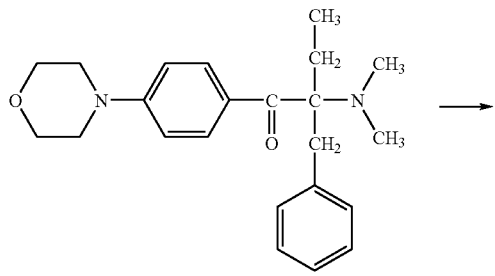

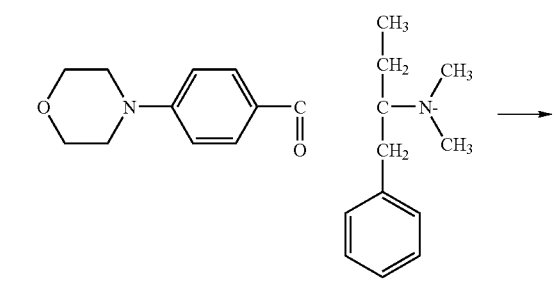

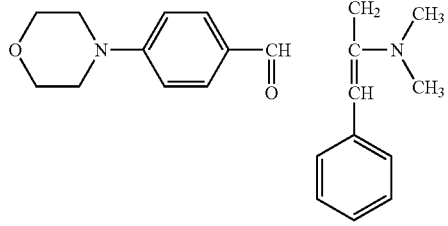

Radicals are not present in the α-aminoketone compound before irradiated with a UV ray, and therefore a polymerization reaction of the photoreactive monomer is not caused. Further, curing of the epoxy resin is not accelerated due to steric hindrance. However, the α-aminoketone compound is dissociated by irradiation with a UV ray, and radicals are produced to bring about polymerization reaction of the photoreactive monomer. Also, the α-aminoketone compound is reduced in steric hindrance due to dissociation thereof to result in the presence of activated amine. Accordingly, it is assumed that the amine results in having a curing accelerating action for the epoxy resin and that since then, the curing accelerating action is exerted by heating. Such action does not allow radicals and activated amines to be present before irradiated with a UV ray, and therefore the adhesive sheet which is very excellent in a storage stability at room temperature can be provided. The curing speeds of the photoreactive monomer and the epoxy resin are changed according to the structures of the radicals and the amines produced by irradiation with a UV ray, and therefore the optical base generating agent (g) can be determined by the epoxy resin (a), the phenol base epoxy resin curing agent (b) and the photoreactive monomer (f).

Capable of being used as the optical base generating agent (g) described above are, for example, 2-methyl-1-(4-methylthiophenyl)-2-morpholinopropane-1-one (Irgacure 907, manufactured by Ciba Specialty Chemicals K.K), 2-benzyl-2-dimethylamino-1-(4-morpholinophenyl)-butanone-1-one (Irgacure 369, manufactured by Ciba Specialty Chemicals K.K), hexaarylbisimidazole derivatives (a phenyl group may be substituted with substituents such as halogen, an alkoxy group, a nitro group, a cyano group and the like), benzisooxazolone derivatives and the like.

In addition to the optical base generating agents described above, a method in which bases are produced by optical Fries rearrangement, optical Claisen rearrangement, Curtius rearrangement and Stevens rearrangement can be used.

The optical base generating agents described above are used in the form of the low molecular compounds having a molecular weight of 500 or less, and in addition thereto, the compounds in which high molecules are introduced into a principal chain and side chains may be used. In this case, the molecular weight is preferably 1000 to 100000, more preferably 5000 to 30000 in terms of a weight average molecular weight from the viewpoint of a pressure-sensitive adhesive property and a fluidity of the pressure-sensitive adhesive.

In the pressure-sensitive adhesive composition of the present invention, a blending amount of the optical base generating agent (g) is preferably 0.1 to 20 parts by mass based on 100 parts by mass of the high molecular compound (c). If it is 0.1 part by mass or more, the reactivity is good, and the residual monomer is decreased. On the other hand, if it is 20 parts by mass or less, an increase in the molecular weight by polymerization reaction functions well; low molecular components are decreased; and possibility to exert an effect on the reflow resistance is reduced. Accordingly, the blending amount is more preferably 0.5 to 15 parts by mass, further preferably 1 to 5 parts by mass.

The pressure-sensitive adhesive composition can be blended with, if necessary, a high molecular resin having a compatibility with the epoxy resin described above, an inorganic filler, various coupling agents, an ion scavenger and the like in addition to the components (a) to (c), (f) and (g) described above as long as the object of the present invention is not damaged.

A blending amount of the high molecular resin having a compatibility with the epoxy resin is preferably 40 parts by mass or less based on total 100 parts by mass of the epoxy resin (a) and the phenol base epoxy resin curing agent (b). If the blending amount falls in the above range, Tg of the epoxy resin layer can be secured.

A blending amount of the inorganic filler is preferably 1 to 40 parts by mass based on 100 parts by mass of the pressure-sensitive adhesive composition. If the above blending amount is 1 part by mass or more, the addition effect is obtained, and if it is 40 parts by mass or less, problems such as a rise in a storage elastic modulus of the adhesive layer, a reduction in the adhesive property, a reduction in the transparency caused by residual voids are less liable to be brought about. Further, a nanofiller is more preferably used in order to enhance a thermal time fluidity of the film.

A blending amount of the coupling agent is preferably 0.01 to 10 parts by mass based on total 100 parts by mass of the high molecular compound (c) containing a functional group and having a weight average molecular weight of 100,000 or more from the viewpoints of an effect thereof, a heat resistance and a cost.

A blending amount of the ion scavenger is preferably 0.1 to 10 parts by mass based on 100 parts by mass of the high molecular compound (c) containing a functional group and having a weight average molecular weight of 100,000 or more from the viewpoints of an effect obtained by adding it, a heat resistance and a cost.

The adhesive sheet of the present invention can be obtained by the same method as in the adhesive sheet described above.

Figure 3:
FIG. 3 is a cross-sectional schematic drawing showing the adhesive sheet of the present invention.

As shown in, for example, FIG. 3, the pressure-sensitive adhesive resin composition is first coated on a protective film 3 (called as well a release sheet) and dried by the same method as described above to form a pressure-sensitive adhesive layer 1'. Then, a supporting base material 2 is laminated thereon, whereby an adhesive sheet 4' comprising the release sheet (protective film 3), the pressure-sensitive adhesive layer 1' and the supporting base material 2 can be obtained. In another way, the pressure-sensitive adhesive resin composition is coated directly on the supporting base material 2 and dried by the same method, whereby the adhesive sheet 4' can be obtained. In this case, a protective film may be laminated if necessary.

The supporting base material used for the adhesive sheet of the present invention or the protective film used if necessary includes the same ones as described above. In this respect, the adhesive sheet is irradiated, as described later, with a UV ray to polymerize and cure the pressure-sensitive adhesive having a UV ray polymerizability, whereby an adhesive strength of an interface between the pressure-sensitive adhesive and the supporting base material is reduced to make it possible to release the supporting base material. Therefore the supporting base material preferably has UV ray transmissive.

A thickness of the pressure-sensitive adhesive layer shall not specifically be restricted, and it is preferably 3 to 200 μm. If it is 3 μm or more, the stress relaxation effect can be enhanced, and if it is 200 μm or less, it is economical and can meet requirement to a reduction in a size of optical devices. From the viewpoint described above, a thickness of the pressure-sensitive adhesive layer is more preferably 5 to 50 μm, further preferably 8 to 30 μm and particularly preferably 10 to 25 μm.

A thickness of the supporting base material shall not specifically be restricted, and it is preferably 5 to 250 μm. If it is 5 μm or more, the workability is enhanced, and if it is 250 μm or less, it is economical and therefore preferred. From the viewpoint described above, a thickness of the supporting base material is more preferably 10 to 200 μm, further preferably 20 to 150 μm and particularly preferably 25 to 125 μm.

A total thickness of the pressure-sensitive adhesive layer and the supporting base material is usually 10 to 250 μm. If a thickness of the supporting base material is set to the same level as or a little larger level than that of the pressure-sensitive adhesive layer, the workability is improved. The specific combination thereof includes 5/25, 10/30, 10/50, 25/50, 50/50, 50/75 and the like in terms of the pressure-sensitive adhesive layer/the supporting base material (μm), and it can suitably be determined according to the conditions used, the devices and the like.

In the adhesive sheet of the present invention, two or more pressure-sensitive adhesives which are prepared separately can be stuck as well on a pressure-sensitive adhesive layer side of the adhesive sheet in order to obtain a desired thickness and enhance the thermal time fluidity. In this case, the sticking conditions on which peeling between the pressure-sensitive adhesive layers is not brought about are necessary.

When the adhesive sheet of the present invention constituted as described above is irradiated with a UV ray, the base material is reduced in an adhesive strength to a large extent after irradiated with a UV ray, and the adhesive sheet can readily be peeled off from the base material while holding the adhesive layer on the adherend.

An optical device in which an optical waveguide is adhered can be prepared by using the adhesive composition for an optical waveguide, the adhesive film for an optical waveguide or the adhesive sheet for an optical waveguide according to the present invention.

A production example of an optical device prepared by using the adhesive film of the present invention shall be explained with reference to FIG. 2.

Figure 2:
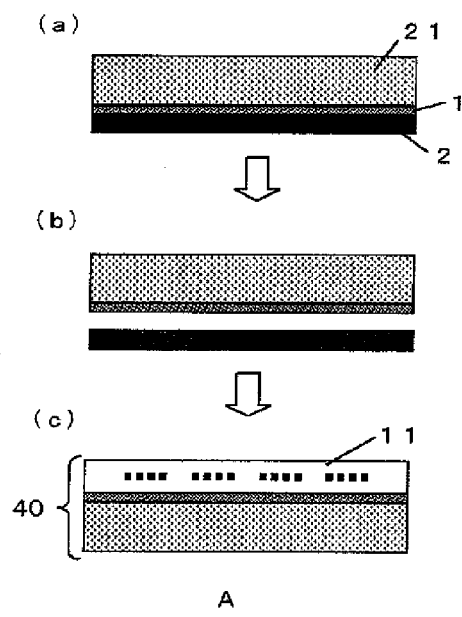
FIG. 2 is a cross-sectional schematic drawing showing a method for use of the adhesive film of the present invention and one example of an optical device, wherein (a) to (c) are drawings for explaining the respective steps of (a) sticking the adhesive film, (b) peeling a supporting base material and (c) adhesion.
Figure 2:
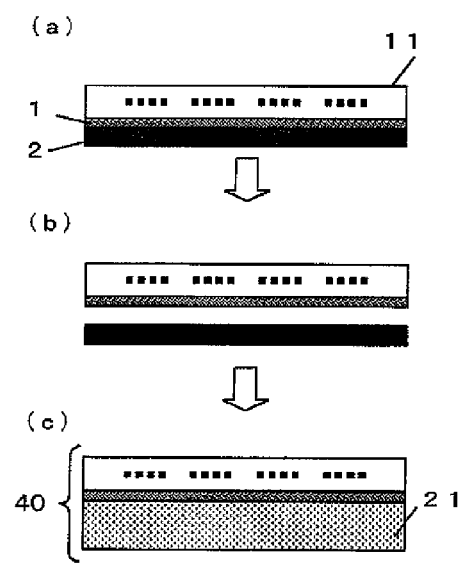

First, when the adhesive film has a protective film, it is peeled off, and an adhesive face of an adhesive layer 1 is stuck on an adherend member 21 (refer to FIG. 2-A (a)). Next, a supporting base material 2 is peeled off (refer to FIG. 2-A (b)). Subsequently, the adherend member 21 on which the adhesive layer 1 is held and an optical waveguide 11 are laminated via the adhesive layer 1, and then the adhesive is heated and cured to produce a targeted optical device 40 (refer to FIG. 2-A (c)). In the above case, an example in which the adhesive film is first laminated on the adherend member and in which it is then adhered on the optical waveguide has been shown, but as shown in FIG. 2-B, this order may be upset.

A method in which the adhesive film is cut into a prescribed shape and in which the adhesive film cut is thermally compressed on a desired position of the optical waveguide and the adherend member is usually used as a method for sticking the adhesive film. However, it shall not be restricted thereto. In this respect, the adherend member shall not specifically be restricted as long as it is used for a targeted optical device, and it includes, for example, ceramic wiring substrates such as a glass epoxy substrate, an organic wiring substrate prepared by using polyimide, an alumina substrate, an aluminum nitride substrate and the like, semiconductor wafers such as silicon and the like, metals such as copper, aluminum and the like and glass materials such as quartz and the like.

Next, a production example of an optical device prepared by using the adhesive sheet of the present invention shall be explained with reference to FIG. 4 and FIG. 5.

Figure 4:
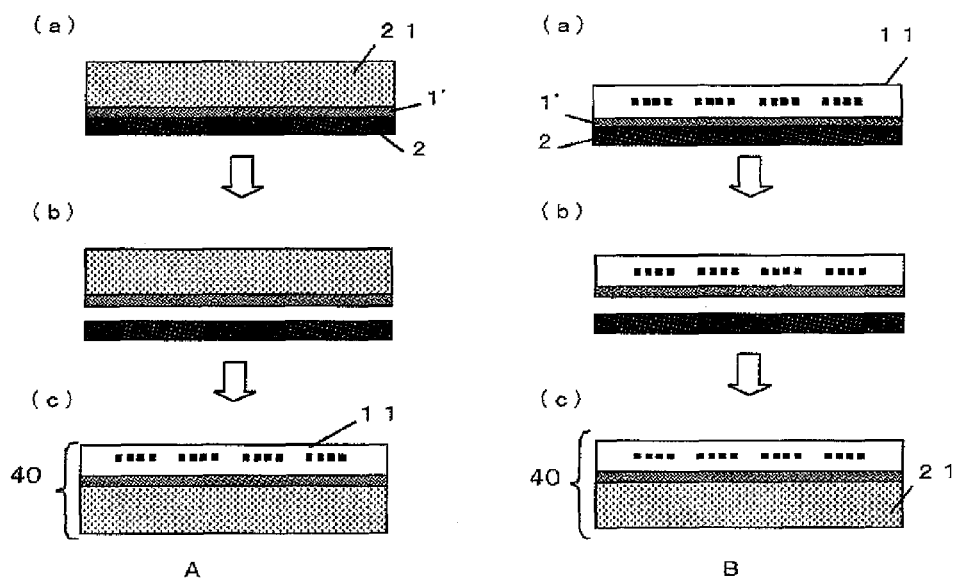
FIG. 4 is a cross-sectional schematic drawing showing a method for use of the adhesive sheet of the present invention and one example of an optical device, wherein (a) to (c) are drawings for explaining the respective steps of (a) sticking the adhesive sheet, (b) peeling a supporting base material and (c) adhesion.

In a production example of an optical device shown in FIG. 4, when a protective film 3 is present, it is peeled off, and an adhesive member 21 is stuck on a pressure-sensitive adhesive face (pressure-sensitive adhesive layer 1') of the adhesive sheet by the same method as the above case in which the adhesive film is used (FIG. 4-A (a)). Next, the adhesive sheet is irradiated with a radial ray to polymerize and cure the adhesive sheet having a property of polymerizing by a radial ray, and then a supporting base material 2 of the adhesive sheet is peeled off (FIG. 4-A (b)). The radial ray includes, for example, a UV ray, an electron beam, an infrared ray and the like. In this respect, a case in which a UV ray is used shall be described. The adhesive sheet is irradiated with a UV ray from a supporting base material face. Though the illuminance and the irradiation dose are varied according to the composition of the pressure-sensitive adhesive, the illuminance is usually about 3 to 100 mW/cm$^2$, and the irradiation dose is usually about 80 to 1000 mJ/cm$^2$. The irradiation dose of such an extent that the photoreactive monomer is almost polymerized is a standard. In this case, the supporting base material of the adhesive sheet has to be UV ray transmissive.

Subsequently, the adherend member on which the pressure-sensitive adhesive is held and an optical waveguide 11 are laminated, and then the pressure-sensitive adhesive is heated and cured to produce a targeted optical device 40 (FIG. 4-A (c)). In the above case, an example in which the adhesive sheet is first laminated on the adherend member and in which it is then adhered on the optical waveguide has been shown, but as shown in FIG. 4-B, this order may be upset.

Figure 5:
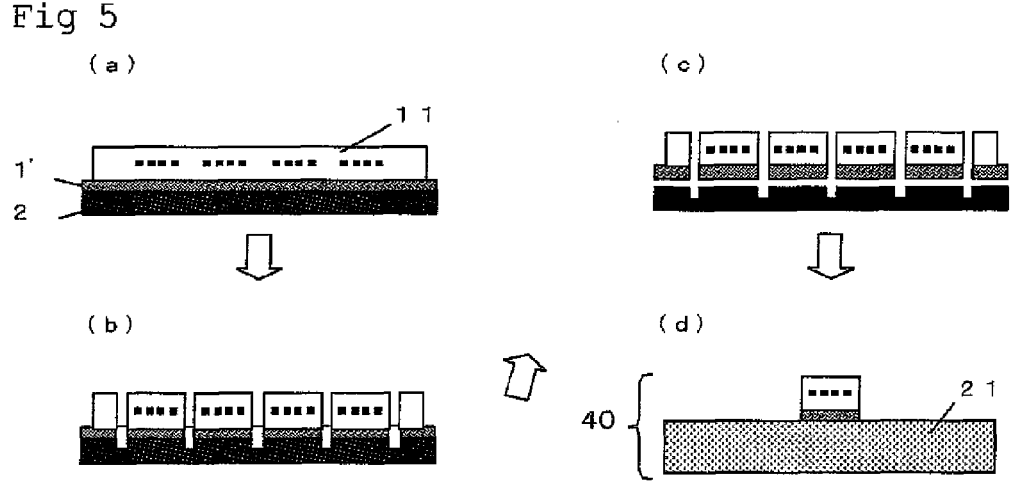
FIG. 5 is a cross-sectional schematic drawing showing a method for use of the adhesive sheet of the present invention and one example of an optical device, wherein (a) to (d) are drawings for explaining the respective steps of (a) sticking the adhesive sheet, (b) dicing an optical waveguide, (c) peeling a supporting base material and (d) adhering onto an adherend.

In a production example of an optical device shown in FIG. 5, when a protective film 3 is present, it is peeled off, and an optical waveguide 11 is laminated on a pressure-sensitive adhesive face (pressure-sensitive adhesive layer 1') of the adhesive sheet (FIG. 5 (a)). Next, the optical waveguide is processed into a targeted shape by dicing and the like (FIG. 5 (b)). Then, the adhesive sheet is irradiated with a radial ray in the same manner as explained in FIG. 4 to polymerize and cure the adhesive sheet having a property of polymerizing by a radial ray, and then a supporting base material is peeled off (FIG. 5 (c)). Subsequently, the optical waveguide on which the pressure-sensitive adhesive is held is laminated on another adherend member 21, and then the pressure-sensitive adhesive is heated and cured to produce a targeted optical device 40 (FIG. 5 (d)). In the above case, an example in which the adhesive sheet is first laminated on the optical waveguide and in which it is then adhered on another adherend member has been shown, but this order may be upset.

In the above explanations, a method in which the adhesive film or the adhesive sheet is used to adhere the optical waveguide prepared in advance to the adherend member has been described. In addition to the above method, a method in which the adhesive film or the adhesive sheet is first laminated on the adherend member and in which an optical waveguide layer, to be specific, a lower cladding layer, a core layer and an upper cladding layer are laminated in order can be used as well to prepare an optical device to which an optical waveguide is adhered by using the adhesive resin composition or the adhesive sheet described above. According to the above method, the optical waveguide can be prepared on the adherend member by buildup, and therefore it is advantageous in a pattern accuracy and a positioning accuracy of the optical waveguide.

EXAMPLES

The present invention shall be explained below in further details with reference to examples, but the present invention shall not be restricted to them.

Example 1-A

Preparation of Adhesive Film

Cyclohexanone was added to a composition comprising 55 parts by mass of YDCN-703 (trade names, manufactured by Tohto Kasei Co., Ltd., cresol novolac type epoxy resin, epoxy equivalent: 210) as (a) an epoxy resin, 45 parts by mass of Milex XLC-LL (trade names, manufactured by Mitsui Chemicals, Inc., phenol resin, hydroxyl equivalent: 175, water absorption coefficient: 1.8% by mass, heat weight loss at 350° C.: 4%) as (b) a curing agent, 1.7 part by mass of NUC A-189 (trade names, manufactured by Nippon Unicar Co., Ltd., γ-mercaptopropyltrimethoxysilane) as a coupling agent and 3.2 parts by mass of NUC A-1160 (trade names, manufactured by Nippon Unicar Co., Ltd., γ-ureidopropyltriethoxysilane) as a silane coupling agent and 32 parts by mass of Aerosil R972 (trade name, manufactured by Nippon Aerosil Co., Ltd., a filler having an organic group such as methyl and the like on a surface which was prepared by coating a surface of silica with dimethyldichlorosilane and hydrolyzing it in a reactor of 400° C., silica, average particle diameter: 0.016 μm) as (d) a filler, and they were stirred and mixed. Further, the mixture was kneaded for 90 minutes by means of a bead mill. Added thereto were 280 parts by mass of acryl rubber containing 3% by mass of glycidyl acrylate or glycidyl methacrylate, HTR-860P-3 (trade name, manufactured by Nagase ChemteX Corporation, weight average molecular weight: 800,000) as (c) a high molecular compound and 0.5 part by mass of Curesol 2PZ-CN (trade name, manufactured by Shikoku Chemicals Corporation, 1-cyanoethyl-2-phenylimidazole) as (e) a curing accelerating agent, and they were stirred and mixed and subjected to vacuum deaeration. This adhesive vanish was coated on a polyethylene terephthalate (PET) film having a thickness of 75 μm which was subjected to releasing treatment and dried by heating at 140° C. for 5 minutes to form a coating film having a thickness of 10 μm which stayed in a B stage state, whereby an adhesive film provided with a supporting film was prepared.

The adhesive film described above was cured at 170° C. for one hour, and a storage elastic modulus of the adhesive composition was measured (sample size: length 20 mm, width 4 mm and film thickness 80 μm, heating rate: 5° C./minute, tensile mode, 10 Hz, automatic static loading) by means of a dynamic viscoelasticity measuring apparatus (DVE-V4, manufactured by Rheology Co., Ltd.) to result in finding that it was 380 MPa at 25° C. and 5 MPa at 260° C.

Example 1-B

Preparation of Adhesive Sheet 1

Added were 100 parts by mass of HTR-860P-3 (trade name, manufactured by Nagase ChemteX Corporation, glycidyl group-containing acryl rubber, weight average molecular weight: 800,000, Tg: −7° C.) as (c) a high molecular compound, 5.4 parts by mass of YDCN-703 (trade name, manufactured by Tohto Kasei Co., Ltd., o-cresol novolac type epoxy resin, epoxy equivalent: 210) and 16.2 parts by mass of YDCN-8170C (trade name, manufactured by Tohto Kasei Co., Ltd., bisphenol F type epoxy resin, epoxy equivalent: 157) as (a) an epoxy resin, 15.3 parts by mass of Phenolite LF2882 (trade name, manufactured by Dainippon Ink & Chemicals Inc., bisphenol A novolac resin, hydroxyl equivalent: 118 g/eq) as (b) a phenol base epoxy resin curing agent, 0.1 part by mass of NUC A-189 (trade name, manufactured by Nippon Unicar Co., Ltd., γ-mercaptopropyltrimethoxysilane) and 0.3 part by mass of NUC A-1160 (trade name, manufactured by Nippon Unicar Co., Ltd., 3-ureidopropyltriethoxysilane) as a silane coupling agent, 30 parts by mass of A-DPH (trade name, manufactured by Shin-Nakamura Chemical Co., Ltd., dipentaerythritol hexaacrylate) as (f) a photoreactive monomer, 1.5 part by mass of Irgacure 369 (trade name, manufactured by Ciba Specialty Chemicals K.K, 2-benzyl-2-dimethylamino-1-(4-morpholinophenyl)-butanone-1-one: 1-369) as (g) an optical base generating agent and cyclohexanone as an organic solvent, and they were stirred and mixed and subjected to vacuum deaeration. This adhesive resin composition vanish was coated on surface releasing treated polyethylene terephthalate (Teijin Tetron film: A-31, manufactured by Teijin Limited) having a thickness of 75 μm and dried by heating at 80° C. for 30 minutes to obtain an adhesive sheet. A UV ray transmissive supporting base material (low density polyethylene terephthalate/vinyl acetate/low density polyethylene terephthalate three layer film: FHF-100, manufactured by Thermo Co., Ltd.) having a thickness of 80 μm was laminated on the above adhesive sheet, whereby prepared was an adhesive sheet 1 comprising the protective layer (surface releasing treated polyethylene terephthalate described above), the pressure-sensitive adhesive layer and the UV ray transmissive supporting base material.

The adhesive sheet 1 described above was cured at 160° C. for one hour, and a storage elastic modulus of the adhesive resin composition was measured (sample size: length 20 mm, width 4 mm and film thickness 80 μm, heating rate: 5° C./minute, tensile mode, 10 Hz, automatic static loading) by means of the dynamic viscoelasticity measuring apparatus (DVE-V4, manufactured by Rheology Co., Ltd.) to result in finding that it was 400 MPa at 25° C. and 5 MPa at 260° C.

Example 2-B

Preparation of Adhesive Sheet 2

An adhesive sheet 2 was prepared by the same operation as in Example 1-B, except that Irgacure 369 was changed to Irgacure 907 (trade name, manufactured by Ciba Specialty Chemicals K.K, 2-methyl-1-(4-methylthiophenyl)-2-morpholinopropane-1-one: 1-907) as (g) the optical base generating agent of the pressure-sensitive adhesive component. The adhesive sheet 2 described above was cured at 160° C. for one hour, and a storage elastic modulus of the adhesive resin composition was measured on the same conditions as in Example 1-B by means of the dynamic viscoelasticity measuring apparatus (DVE-V4, manufactured by Rheology Co., Ltd.) to result in finding that it was 400 MPa at 25° C. and 5 MPa at 260° C.

Preparation of a Resin Film for Forming an Optical Waveguide:

Preparation of a Resin Film for Forming a Cladding Layer:

Weighed into a wide mouth plastic bottle were 50 parts by mass of a phenoxy resin (trade name: Phenotohto YP-70, manufactured by Tohto Kasei Co., Ltd.) as a binder polymer, 50 parts by mass of alicyclic diepoxycarboxylate (trade name: KRM-2110, molecular weight: 252, manufactured by Asahi Denka Co., Ltd.) as a photopolymerizable compound, 4 parts by mass of triphenylsulfonium hexafluoroantimonate salt (trade name: SP-170, manufactured by Asahi Denka Co., Ltd.) as a photopolymerization initiator, 0.4 part by mass of SP-100 (trade name, manufactured by Asahi Denka Co., Ltd.) as a sensitizer and 40 parts by mass of propylene glycol monomethyl ether acetate as an organic solvent, and they were stirred on the conditions of a temperature of 25° C. and a revolution of 400 rpm for 6 hours by means of a mechanical stirrer, a shaft and a propeller to prepare a resin vanish for forming a cladding layer. Then, the resin vanish was filtrated under pressure through a polyflon filter having a pore diameter of 2 µm (trade name: PF020, manufactured by Advantec MFS, Inc.) on the conditions of a temperature of 25° C. and a pressure of 0.4 MPa, and it was further deaerated under reduced pressure for 15 minutes on the condition of a vacuum degree of 50 mm Hg by means of a vacuum pump and a bell jar.

The resin vanish for forming a cladding layer obtained above was coated on a corona-treated surface of a polyamide film (trade name: Mictron, manufactured by Toray Industries, Inc., thickness: 12 µm) by means of a coating machine (Multicoater TM-MC, manufactured by Hirano Tecseed Co., Ltd.), and it was dried at 80° C. for 10 minutes and then at 100° C. for 10 minutes. Thereafter, a release PET film (trade name: A31, manufactured by Teijin DuPont Films Japan Ltd., thickness: 25 µm) as a protective film was stuck thereon so that a release surface faced the resin side to obtain a resin film for forming a cladding layer. In this case, a thickness of the resin layer could optionally be controlled by controlling a gap of the coating machine, and in the present example, the thickness was controlled so that the film thicknesses after cured were set to 30 µm for the lower cladding layer and 80 µm for the upper cladding layer.

Preparation of a Resin Film for Forming a Core Layer:

A resin vanish for forming a core layer was prepared by the same method and on the same conditions as in the preparation example of the resin film for forming a cladding layer described above, except that used were 26 parts by mass of the phenoxy resin (trade name: Phenotohto YP-70, manufactured by Tohto Kasei Co., Ltd.) as the binder polymer, 36 parts by mass of 9,9-bis[4-(2-acryloyloxyethoxy)phenyl]fluorene (trade name: A-BPEF, manufactured by Shin-Nakamura Chemical Co., Ltd.) and 36 parts by mass of bisphenol A type epoxy acrylate (trade name: EA-1020, manufactured by Shin-Nakamura Chemical Co., Ltd.) as the photopolymerizable compound, 2 parts by mass of bis(2,4,6-trimethylbenzoyl) phenylphosphine oxide (trade name: Irgacure 819, manufactured by Ciba Specialty Chemicals K.K) as the photopolymerization initiator and 40 parts by mass of propylene glycol monomethyl ether acetate as the organic solvent. Then, the resin vanish was filtrated under pressure and further deaerated under reduced pressure.

The resin vanish for forming a core layer obtained above was coated on a non-treated surface of a PET film (trade name: COSMO SHINE A1517, manufactured by Toyobo Co., Ltd., thickness: 16 µm) and dried by the same method as in the preparation example of the resin film for forming a cladding layer described above. Then, the release PET film (trade name: A31, manufactured by Teijin DuPont Films Japan Ltd., thickness: 25 µm) as a protective film was stuck thereon so that a release surface faced the resin side to obtain a resin film for forming a core layer. In the present example, a gap of the coating machine was controlled so that the film thickness after cured was set to 50 µm.

Preparation of an Optical Waveguide:

The release PET film (A31) which was the protective film of the resin film for forming a lower cladding layer obtained above was peeled off, and the resin film was irradiated with a UV ray (wavelength: 365 nm) at 1 J/cm² from a resin side (a side reverse to the base material film) by means of a UV ray exposing machine (EXM-1172, manufactured by Orc Manufacturing Co., Ltd.) and then subjected to heat treatment at 80° C. for 10 minutes, whereby a lower cladding layer 32 was formed (refer to FIG. 6 (*a*)).

Next, the resin film for forming a core layer described above was laminated on the above lower cladding layer 32 on the conditions of a pressure of 0.4 MPa, a temperature of 50° C. and a laminating speed of 0.2 m/minute by means of a roll laminator (HLM-1500, manufactured by Hitachi Plant Techno Co., Ltd.), and then they were vacuumed to 500 Pa or lower by means of a vacuum press laminator (MVLP-500, manufactured by Meiki Co., Ltd.) as a flat plate type laminator. Thereafter, it was heated and compressed on the conditions of a pressure of 0.4 MPa, a temperature of 50° C. and a pressing time of 30 seconds to form a core layer 33 (refer to FIG. 6 (*b*)).

Next, the resin film was irradiated with a UV ray (wavelength: 365 nm) at 0.6 J/cm² by means of the UV ray exposing machine described above via a negative type photo mask 35 having a width of 50 µm (refer to FIG. 6 (*c*)), and then it was heated at 80° C. for 5 minutes after exposed. Thereafter, the PET film which was the supporting film was peeled off, and a core pattern 36 was developed in a developer (propylene glycol monomethyl ether acetate/N,N-dimethylacetamide=8/2, mass ratio) (refer to FIG. 6 (*d*)). Subsequently, the resin film was washed with a washing liquid (isopropanol) and heated and dried at 100° C. for 10 minutes.

Then, the resin film for forming a cladding layer described above was laminated thereon as an upper cladding layer 37 on the same laminating conditions as described above. Further, both faces thereof were irradiated with a UV ray (wavelength: 365 nm) at 25 J/cm² in total, and then the resin film was subjected to heat treatment at 160° C. for one hour, whereby the upper cladding layer 37 was formed to prepare a flexible optical waveguide in which the base material film was disposed at an outside (refer to FIG. 6 (*e*)). Further, the above flexible optical waveguide was treated for 100 hours on a high temperature and high humidity condition of 85° C./85% for peeling off the polyamide film to prepare an optical waveguide in which the base material film 38 was removed (refer to FIG. 6 (*f*)). Then, a flexible optical waveguide having a waveguide length of 5 cm was cut out by means of a dicing saw (DAD-341, manufactured by DISCO Corporation).

The refractive indices of the core layer and the cladding layer were measured by means of a prism coupler (Model 2010) manufactured by Metricon Inc. to find that a refractive index of the core layer was 1.584 at a wavelength of 830 nm and that a refractive index of the cladding layer was 1.550. Further, a transmission loss of the optical waveguide prepared was measured by a cutback method (measured waveguide lengths: 10, 5, 3 and 2 cm, input fiber: GI-50/125 multimode fiber (NA=0.20), output fiber: SI-114/125 (NA=0.22)) using a 850 nm-VCSEL (vertical cavity surface emission laser) (FLS-300-01-VCL, manufactured by EXFO Inc.) for a light source and Q82214 manufactured by Advantest Corporation for a photodiode to find that it was 0.1 dB/cm.

Evaluation of Adhesive Film and Adhesive Sheet:

(1) Evaluation of Adhesive Property

Preparation of Test Sample:

The adhesive film obtained in Example 1-A was roll-laminated on various members (a glass epoxy substrate (trade name: MCL-E-679F, thickness: 0.6 µm, manufactured by Hitachi Chemical Co., Ltd.), a polyimide film (trade name: Kapton EN, thickness: 25 µm, manufactured by Du Pont-Toray Co., Ltd.), a copper foil (trade name: GTS-35, thickness: 35 µm, a glossy surface used, manufactured by Furukawa Circuit Foil Co., Ltd.), an aluminum foil (trade name: AIN30H-H, a glossy surface used, thickness: 30 μm, manufactured by Takeuchi Metal Foil Co., Ltd.), a silicon substrate (thickness: 0.625 μm, manufactured by Mitsubishi Materials Corporation) and an oxide film-formed silicon substrate (thickness: 0.625 μm, formed with an oxide film of 1 μm, manufactured by Mitsubishi Materials Corporation)) on the conditions of 60° C., 0.5 MPa and a delivering speed of 0.2 m/minute. Further, the adhesive films obtained in Examples 1-B and 2-B were roll-laminated on the various members described above on the same conditions as described above after peeling off the protective films.

Thereafter, the supporting film or the supporting base material was peeled off, and the flexible optical waveguide prepared above was roll-laminated thereon on the conditions of 80° C., 0.5 MPa and a delivering speed of 0.5 m. Subsequently, the adhesive films were cured by heating at 180° C. for one hour to prepare test samples for evaluating an adhesive property.
Evaluation Method and Results:

The adhesive property (number of peeled crosscuts) before and after a reflow test was measured by a crosscut tape method (according to JIS-K5400). The results thereof are shown in Tables 1 and 2. In the reflow test, a lead solder free reflow test of a maximum temperature of 265° C. was carried out three times on conditions based on IPC/JEDEC J-STD-020B by means of a reflow test machine (Salamander XNA-645PC, manufactured by The Furukawa Electric Co., Ltd.). The detailed reflow conditions are shown in Table 3, and a temperature profile in a reflow furnace is shown in FIG. 7. In the following reflow tests, the procedure was carried out in the same manner.

(2) Evaluation of Light Transmittance
Preparation of Test Sample:

The adhesive film described above or the adhesive sheet in which the protective film was peeled off was roll-laminated on a slide glass having a thickness of 1 mm on the conditions of 60° C., 0.5 MPa and a delivering speed of 0.5 m/minute and then irradiated with a UV ray, and the supporting film or the supporting base material was peeled off. Then, the adhesive film was cured by heating at 180° C. for one hour to prepare a test sample for evaluating a light transmittance.
Evaluation Method and Results:

The light transmittance in a wavelength of 700 to 1600 nm before and after the reflow test was measured by means of a spectrophotometer U-3410 manufactured by Hitachi, Ltd. The results thereof are shown in FIGS. 8 to 10. Further, the total light transmittance was measured according to JIS-K7105 by means of a color difference turbidity measuring equipment COH-300A manufactured by Nippon Denshoku Industries Co., Ltd. The results thereof are shown in Tables 1 and 2.

(3) Evaluation of Refractive Index
Preparation of Test Sample:

A test sample for measuring a refractive index was prepared in the same manner as in the test sample of (2) for evaluating a light transmittance.
Evaluation Method and Results:

The refractive index in a wavelength of 830 nm before and after the reflow test was measured by means of a prism coupler (Model 2010) manufactured by Metricon Inc., and the results thereof are shown in Tables 1 and 2. It was found that a change in the refractive index before and after the reflow test was 0.001.

(4) Evaluation of Insertion Loss of Optical Waveguide after Adhered
Preparation of Test Sample:

A silicon substrate (thickness: 0.625 μm, manufactured by Mitsubishi Materials Corporation) was used as an adherend member, and an optical waveguide was adhered to the silicon substrate by the method shown in preparing the test samples for evaluating an adhesive property described above. This was processed by means of a dicing saw (DAD-341, manufactured by DISCO Corporation) so that a length of the optical waveguide was 10 cm to prepare a test sample for evaluating an insertion loss.
Evaluation Method and Results:

An insertion loss of the optical waveguide before and after the reflow test was measured by a cutback method (measured lengths of the optical waveguide: 10, 5, 3 and 2 cm, input fiber: GI-50/125 multimode fiber (NA=0.20), output fiber: SI-114/125 (NA=0.22)) using a 850 nm-VCSEL (vertical cavity surface emission laser) (FLS-300-01-VCL, manufactured by EXFO Inc.) for a light source and Q82214 manufactured by Advantest Corporation for a photodiode. The results thereof are shown in Tables 1 and 2.

(5) Dynamic Bending Endurance Test
Preparation of Test Sample:

A polyimide film (trade name: Kapton EN, thickness: 25 μm, manufactured by Du Pont-Toray Co., Ltd.) was used as an adherend member, and an optical waveguide was adhered to the polyimide film by the method shown in preparing the test samples for evaluating an adhesive property described above. This was processed by means of the dicing saw (DAD-341, manufactured by DISCO Corporation) so that the optical waveguide was set to a length of 10 cm and a width of 5 mm to prepare an optical device.
Evaluation Method and Results:

A dynamic bending endurance test was carried out 100,000 times on the conditions of a curvature radius of 2 mm and a bending frequency of twice/second by means of a bending endurance machine (manufactured by Daisho Denshi Co., Ltd.), and the sample after finishing the test was observed under a microscope of 200 magnifications. As a result thereof, breakage was not observed in a core and a clad of the optical waveguide even after finishing bending of 100,000 times. Further, delamination was not observed in all interfaces of polyimide, the adhesive and the optical waveguide, and the optical device prepared by adhering the optical waveguide to the polyimide film had a good bending property.

TABLE 1

| Items | | Example 1-A (adhesive film/optical device) | |
|---|---|---|---|
| | | Before reflow | After reflow |
| Thickness of adhesive layer (μm) | | 10 | |
| Adhesive property (evaluation score; number of peeled crosscuts shown in parenthesis) | Glass epoxy substrate | 10 (0/100) | 10 (0/100) |
| | Polyimide film | 10 (0/100) | 10 (0/100) |
| | Copper foil | 10 (0/100) | 10 (0/100) |
| | Aluminum foil | 10 (0/100) | 10 (0/100) |
| | Silicon substrate | 10 (0/100) | 10 (0/100) |
| | Oxide film-formed silicon substrate | 10 (0/100) | 10 (0/100) |
| Light transmittance (%) | Total light transmittance | 88 | 87 |
| | Wavelength 700 to 1600 nm | ≧81 | ≧81 |
| | Wavelength 850 nm | 89 | 89 |
| Refractive index | | 1.512 | 1.511 |
| Refractive index difference before and after reflow | | 0.001 | |
| Insertion loss of optical waveguide (dB) | | 1 | 1 |

TABLE 2

| Items | | Example 1-B | | Example 2-B | |
|---|---|---|---|---|---|
| | | Before reflow | After reflow | Before reflow | After reflow |
| Thickness of pressure-sensitive adhesive layer (μm) | | 10 | | 10 | |
| Adhesive property (evaluation score; number of peeled crosscuts shown in parenthesis) | Glass epoxy substrate | 10 (0/100) | 10 (0/100) | 10 (0/100) | 10 (0/100) |
| | Polyimide film | 10 (0/100) | 10 (0/100) | 10 (0/100) | 10 (0/100) |
| | Copper foil | 10 (0/100) | 10 (0/100) | 10 (0/100) | 10 (0/100) |
| | Aluminum foil | 10 (0/100) | 10 (0/100) | 10 (0/100) | 10 (0/100) |
| | Silicon substrate | 10 (0/100) | 10 (0/100) | 10 (0/100) | 10 (0/100) |
| | Oxide film- formed silicon substrate | 10 (0/100) | 10 (0/100) | 10 (0/100) | 10 (0/100) |
| Light transmittance (%) | Wavelength 700 to 1600 nm | ≧96 | ≧96 | ≧97 | ≧97 |
| | Total light transmittance | 94 | 94 | 97 | 96 |
| | Wavelength 850 nm | 98 | 98 | 98 | 97 |
| Refractive index | | 1.508 | 1.507 | 1.500 | 1.499 |
| Refractive index difference before and after reflow | | 0.001 | | 0.001 | |
| Insertion loss of optical waveguide (dB) | | 1 | 1 | 1 | 1 |

TABLE 3

| Zone number | 1 | 2 | 3 | 4 | 5 | 6 | 7 |
|---|---|---|---|---|---|---|---|
| Temperature (° C.) set for upper heater | 175 | 195 | 220 | 250 | 280 | 220 | 0 |
| Temperature (° C.) set for lower heater | 175 | 195 | 220 | 250 | 300 | 240 | — |
| Conveyor speed (cm/min.) | | | | 60 | | | |

As shown above, it has been found that the good results are obtained in all evaluations; the adhesive films and the adhesive sheets according to the present invention have a good transparency and a good heat resistance; and in addition thereto, the optical devices prepared by adhering the optical waveguide to the polyimide film have a good bending property.

INDUSTRIAL APPLICABILITY

The adhesive composition, the adhesive film and the adhesive sheet according to the present invention have a good bending property in addition to an excellent transparency and an excellent heat resistance attributable to the constitutions described above. Accordingly, the optical devices prepared by using them can be applied to the wide fields such as optical interconnections and the like.

What is claimed is:

1. An adhesive composition for an optical waveguide comprising (a) an epoxy resin, (b) a curing agent, (c) a high molecular compound, (f) a photoreactive monomer in which a cured matter thereof obtained by irradiation with a UV ray has Tg of 250° C. or higher, and (g) a photoinitiator generating a base and a radical by irradiation with a UV ray having a wavelength of 200 to 450 nm, wherein a total light transmittance and a light transmittance in a wavelength of 700 to 1600 nm in a cured matter of the adhesive composition are 80% or more.

2. The adhesive composition for an optical waveguide according to claim 1, wherein after carrying out three times a reflow test at a maximum temperature of 265° C., a total light transmittance and a light transmittance in a wavelength of 700 to 1600 nm in the above cured matter are 80% or more.

3. The adhesive composition for an optical waveguide according to claim 1, wherein a change in a refractive index of the above cured matter before and after carrying out three times the reflow test at a maximum temperature of 265° C. falls within ±0.005.

4. The adhesive composition for an optical waveguide according to claim 1, wherein an evaluation score in an adhesive property of the above cured matter which is measured by a cross-cut tape method after carrying out three times the reflow test at a maximum temperature of 265° C. is 8 points or more.

5. The adhesive composition for an optical waveguide according to claim 1, wherein in a dynamic bending endurance test of an optical waveguide provided with an adhesive prepared by using the adhesive composition described above, mechanical breakage is not generated on the optical waveguide after carrying out 100,000 times the bending test at a curvature radius of 5 mm.

6. The adhesive composition for an optical waveguide according to claim 1, wherein assuming that a total mass of (a) the epoxy resin and (b) the curing agent is set to A and that a mass of (c) the high molecular compound is set to B, a ratio A/B is 0.24 to 1.0.

7. The adhesive composition for an optical waveguide according to claim 1, wherein (a) the epoxy resin is a solid epoxy resin having a softening point of 50° C. or higher which is measured by a ring and ball method.

8. The adhesive composition for an optical waveguide according to claim 1, wherein (a) the epoxy resin does not have a mutagenicity.

9. The adhesive composition for an optical waveguide according to claim 1, wherein (b) the curing agent is a phenol resin having a hydroxyl equivalent of 150 g/eq or more.

10. The adhesive composition for an optical waveguide according to claim 9, wherein (b) the curing agent is a phenol resin represented by the following Formula (I):

[Formula 1]

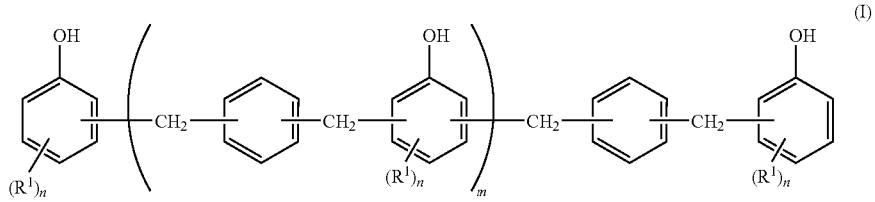

(wherein R¹ each may be the same or different and represents a hydrogen atom, a linear or branched alkyl group having 1 to 10 carbon atoms, a cyclic alkyl group, an aralkyl group, an alkenyl group, a hydroxyl group, an aryl group or a halogen atom; n represents an integer of 1 to 3; and m represents an integer of 0 to 50).

11. The adhesive composition for an optical waveguide according to claim 10, wherein the phenol resin represented by Formula (I) has a water absorption coefficient of 2 mass % or less.

12. The adhesive composition for an optical waveguide according to claim 1, wherein (c) the high molecular compound is a functional group-containing acryl copolymer.

13. The adhesive composition for an optical waveguide according to claim 12, wherein the functional group-containing acryl copolymer is an epoxy group-containing acryl copolymer.

14. The adhesive composition for an optical waveguide according to claim 13, wherein the epoxy group-containing acryl copolymer contains 0.5 to 6 mass % of glycidyl acrylate or glycidyl methacrylate as a raw material therefor.

15. The adhesive composition for an optical waveguide according to claim 12, wherein the functional group-containing acryl copolymer has a weight average molecular weight of 100,000 or more.

16. The adhesive composition for an optical waveguide according to claim 12, wherein the functional group-containing acryl copolymer has a glass transition temperature of −50 to 30° C.

17. The adhesive composition for an optical waveguide according to claim 1, further comprising (d) a filler.

18. The adhesive composition for an optical waveguide according to claim 17, wherein (c) the high molecular compound is the epoxy group-containing acryl copolymer containing 1.5 to 2.5 mass % of glycidyl acrylate or glycidyl methacrylate and having a weight average molecular weight of 100,000 or more; 1 to 50 parts by mass of (d) the filler based on total 100 parts by mass of (a) the epoxy resin and (b) the curing agent is contained; and (d) the filler is an inorganic filler having an average particle diameter of 0.01 to 0.1 μm.

19. The adhesive composition for an optical waveguide according to claim 1, further comprising (e) a curing accelerating agent.

20. The adhesive composition for an optical waveguide according to claim 19, wherein (e) the curing accelerating agent is an imidazole compound.

21. The adhesive resin composition for an optical waveguide according to claim 1, wherein (b) the curing agent is a phenol base epoxy resin curing agent; and (c) the high molecular compound is a high molecular compound containing a functional group and having a weight average molecular weight of 100,000 or more.

22. The adhesive resin composition for an optical waveguide according to claim 21, wherein (c) the high molecular compound containing a functional group and having a weight average molecular weight of 100,000 or more is a glycidyl group-containing (meth)acryl copolymer containing 0.5 to 6% by mass of a glycidyl group-containing repetitive unit.

23. The adhesive resin composition for an optical waveguide according to claim 21, comprising 5 to 250 parts by mass of (a) the epoxy resin, 5 to 100 parts by mass of (f) the photoreactive monomer in which a cured matter thereof obtained by irradiation with a UV ray has Tg of 250° C. or higher and 0.1 to 20 parts by mass of (g) the photoinitiator generating a base and a radical by irradiation with a UV ray of 200 to 450 nm each based on 100 parts by mass of (c) the high molecular compound containing a functional group and having a weight average molecular weight of 100,000 or more and comprising (b) the phenol base epoxy resin curing agent in a range in which an equivalent ratio of a phenolic hydroxyl group to one epoxy group of the above epoxy resin is 0.5 to 1.5.

24. An adhesive film for an optical waveguide prepared by forming the adhesive composition according to claim 1 into a film form.

25. An adhesive sheet for an optical waveguide comprising the adhesive resin composition for an optical waveguide according to claim 21 and a supporting base material.

26. An optical device prepared by adhering an optical waveguide with the adhesive composition for an optical waveguide according to claim 1.

27. An optical device prepared by adhering an optical waveguide with the adhesive film for an optical waveguide according to claim 24.

28. An optical device prepared by adhering an optical waveguide with the adhesive sheet according to claim 25.

29. The adhesive composition for an optical waveguide according to claim 17, further comprising (e) a curing accelerating agent.

* * * * *